(12) United States Patent
Saito et al.

(10) Patent No.: US 7,092,499 B2
(45) Date of Patent: Aug. 15, 2006

(54) COMMUNICATION APPARATUS

(75) Inventors: Hitoshi Saito, Kanagawa (JP); Shunichi Fujise, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 442 days.

(21) Appl. No.: 10/628,405

(22) Filed: Jul. 29, 2003

(65) Prior Publication Data
US 2004/0114736 A1    Jun. 17, 2004

(30) Foreign Application Priority Data
Jul. 31, 2002   (JP)   ............................ 2002-222719
Jul. 31, 2002   (JP)   ............................ 2002-222721

(51) Int. Cl.
*H04M 11/00*   (2006.01)
(52) U.S. Cl. ................. 379/100.16; 379/93.09
(58) Field of Classification Search .......... 379/100.15, 379/100.16, 100.14, 100.01, 93.09
See application file for complete search history.

(56) References Cited

U.S. PATENT DOCUMENTS

| | | | | |
|---|---|---|---|---|
| 5,187,736 A | * | 2/1993 | Moriizumi | ............. 379/100.06 |
| 5,444,771 A | * | 8/1995 | Ohnishi | ................. 379/100.16 |
| 5,644,633 A | * | 7/1997 | Kaufeld et al. | ......... 379/357.05 |
| 6,005,675 A | | 12/1999 | Maeda et al. | ............... 358/442 |
| 6,311,233 B1 | | 10/2001 | Nishioka et al. | ............... 710/14 |
| 6,366,363 B1 | | 4/2002 | Harada et al. | .............. 358/434 |
| 6,408,057 B1 | * | 6/2002 | Lee et al. | ................. 379/93.09 |
| 6,442,252 B1 | | 8/2002 | Fujise et al. | ........... 379/100.01 |
| 2002/0015181 A1 | | 2/2002 | Murata et al. | ............. 358/1.15 |
| 2003/0084122 A1 | | 5/2003 | Saito | ......................... 709/218 |

FOREIGN PATENT DOCUMENTS

| | | |
|---|---|---|
| JP | 1-129649 | 5/1989 |
| JP | 3055343 | 4/2000 |

* cited by examiner

*Primary Examiner*—Stella Woo
(74) *Attorney, Agent, or Firm*—Fitzpatrick, Cella, Harper & Scinto

(57) ABSTRACT

Disclosed is a communication apparatus connected to an analog public line, which can be actualized at low costs and can save its space. This communication apparatus includes a first communication means connected to a telephone line, for performing communications, and a connecting means for connecting a second communication means connected to the telephone line via the first communication means and thus performing communications. In this communication apparatus, the first communication means has a first switch means for connecting the telephone line to the first communication means or the second communication means, a first route means for connecting the second communication means to the telephone line via the first switch means, a second route means for connecting the second communication means directly to the telephone line, a second switch means for connecting the second communication means to the first route means or the second route means, a first hook detecting means connected to the first route means, and a second hook detecting means connected between the telephone line on the second route means and the second switch means.

27 Claims, 14 Drawing Sheets

COMMUNICATION APPARATUS

BACKGROUND OF THE INVENTION

1. Field of the Invention

The present invention relates to a communication apparatus for detecting a hook-state of a second communication means such as a telephone set in facsimile apparatus and data communication apparatus that can be utilized by connecting the second communication means thereto.

2. Related Background Art

CONVENTIONAL EXAMPLE 1

FIG. 6 is a diagram showing a conventional communication apparatus 600.

This conventional communication apparatus 600 is utilized in such configuration that communication means CS61 and CS62 are connected to one analog public line (PSTN: Public Switched Telephone Network), and a telephone set defined as the second communication means CS62 is connected to a facsimile apparatus defined as the first communication means CS61.

In the conventional communication apparatus 600, a line connects to terminals L1 and L2, while the telephone set connects to terminals T1, and T2. The first communication means CS61 includes a MODEM 64 (which is a facsimile MODEM or a data communication MODEM) and thus performs communications.

Then, a CML relay 61 is provided as a first switch means, and the telephone set or the MODEM 64 of the first communication means CS61 can be used by connecting the line to the side of the telephone set or the side of the MODEM 64 of the first communication means CS61.

Namely, the line, if the CML relay 61 is switched OFF, connects to the telephone set and, if switched ON, connects to the MODEM 64, whereby the telephone set or the MODEM 64 can operate.

A transformer 63 transmits analog signals for communications. A DC capture unit 62 allows a DC current from a telephone line to flow, whereby an exchanger of a telephone office recognizes that the communication apparatus is establishing the connection with the line.

When the CML relay 61 connects to the ON-side, the line is connected to the transformer 63 and the DC capture unit 62 of the first communication means CS61, and therefore the facsimile apparatus as the first communication means becomes capable of performing the communications through the MODEM 63.

In this case, since the line is single, only one of the facsimile apparatus and the telephone set is usable, and the facsimile apparatus is therefore required to monitor a line active state (on-hook/off-hook-state) of the telephone set at all times.

In the case of detecting a hook-state of the telephone set, a current flowing when the telephone set is off-hooked, is flowed to a HOOK detector 66, and hook detection of the telephone set is conducted based on a HOOK signal outputted from this HOOK detector 66.

The HOOK detector 66 is constructed of a current sensor, a current detection relay, etc. that utilize a photo coupler, a Hall-effect device or the like.

Namely, a line DC voltage is applied to a connecting unit of the telephone set as the second communication means CS62 through the facsimile apparatus as the conventional communication apparatus 600, or the voltage is applied to the connecting unit from a DC power source 67 within the facsimile apparatus. When the telephone set is in its on-hook-state, the current does not flow, and hence the HOOK detector 66 does not output the HOOK signal. While on the other hand, when the telephone set is in its off-hook-state, a proper current flows, and the HOOK detector 66 outputs the HOOK signal. Accordingly, the facsimile apparatus as the conventional communication apparatus 600 becomes capable of detecting the hook-state of the telephone set as the second communication means CS62.

The HOOK detector 66, normally when a DC current on the order of 5 to 10 mA flows, determines that the off-hook is detected.

On the other hand, a second switch (H relay 65) is provided inside the facsimile apparatus and, when the telephone set is switched over to the line side or the DC power source 67 within the facsimile apparatus, the following operations can be actualized.

The first switch (CML relay 61) is connected to the side of the telephone set (OFF-side), and the second switch (H relay 65) is connected to the line side (OFF-side), whereby the telephone set comes to a usable state, and the hooking can be detected based on the line DC voltage. Namely, it is feasible to detect the hook-state in a wait state and in the telephone usable state.

Further, if the second switch (H relay 65) is connected to the side (ON-side) of the DC power source 67 in the facsimile apparatus irrespective of the connecting direction of the first switch (CML relay 61), the hook detection of the telephone set can be attained based on the DC power source 67 within the facsimile apparatus. Accordingly, the hook detection of the telephone set can be done when the facsimile apparatus is in the operation state as well as in the case of the facsimile apparatus being in the wait state.

Moreover, if a calling signal is received from the line when in the wait state, this calling signal reaches the telephone set in the case where the second switch (H relay 65) is connected with the line side, with the result that the telephone set rings. Whereas if the second switch (H relay 65) is connected to the side of the DC power source 67 within the facsimile apparatus, the calling signal does not arrive at the telephone set, and the telephone set does not ring.

Any one of these cases can be selected by control or setting of the facsimile apparatus.

Further, Japanese Patent Application Laid-Open No. 1-129649 discloses that a detecting means for detecting a state of a speech means is provided with an applying means for applying a voltage from the line, and the detecting means detects the state of the speech means on the basis of the voltage applied by the applying means.

Moreover, Japanese Patent No. 3055343 discloses a facsimile apparatus provided with an invalidating means for invalidating a calling signal for ringing of an extension (or subsidiary) phone by use of unidirectional devices and, besides, capable of detecting a hook-state of the subsidiary phone.

According to the conventional example described above, in the case of applying the DC power source of the facsimile apparatus as the conventional communication apparatus 600 to the connecting unit of the telephone set as the second communication means CS62, if the secondary DC power source provided inside the conventional communication apparatus 600 is utilized as it is, it is required that this DC power source be separated by insulation from other secondary circuits of the conventional communication apparatus 600. If a circuit for this insulating separation is provided, there arises a problem, wherein this circuit is costly and needs both a wider space for use and extra electric power of consumption.

Further, according to the conventional example given above, internal noises of the conventional communication apparatus 600 are easy to occur in the second communication means CS62 and on the line as well. Then, there arises a necessity of providing a noise preventive circuit for restraining those noises. A problem in the case of providing this noise preventive circuit is that this circuit is costly and needs its space.

Moreover, according to the conventional example described above, when using the telephone set as the second communication means CS62, for assuring an operation thereof, the HOOK detector is required to meet the standards of the line for using the telephone set. Namely, there is a necessity of meeting the standards such as "insertion loss" defined as a standard for restraining a signal loss in a voice band, "series DC resistance" defined as a standard for restraining a resistance value between the line connecting unit of the conventional communication apparatus 600 and the connecting unit of the telephone set as the second communication means CS62, i.e., between a terminal L1/L2 and a terminal T1/T2 in the conventional communication apparatus 600, and so forth.

If it is required to detect the off-hook of the telephone set as the second communication means CS62 by use of a current value smaller than 5 to 10 mA, however, even though the HOOK detector is constructed as the standards require, there is still such a problem that it is difficult to meet the above standards simultaneously.

Further, the conventional method disclosed in Japanese Patent Application Laid-Open No. 1-129649, provides one single means for detecting a state of the speech means, and in this case only one type of detection sensitivity can be actualized. There might be a case where the state of the speech means cannot be detected depending on a level of the line voltage. For example, when a line relay (CML) is connected to a MODEM unit 1, the line current flows to the MODEM unit 1. But, in the case of turning on a H relay at the same time to detect the state of a telephone set 2, especially the off-hook, if a DC impedance of the telephone set 2 is higher than a DC impedance of the MODEM unit 1, the DC current flowing to the side of the telephone set 2 becomes smaller than the current needed for an off-hook-state detecting means of the telephone set 2. This causes a problem in which the off-hook of the telephone set 2 cannot be detected.

Moreover, according to the conventional method described above, there is no means for preventing the telephone set to ring, so that when the communication apparatus is not in the operation state, the arrived calling signal invariably reaches the telephone set, resulting in such a problem that the telephone set is to ring in the case where the telephone set is not desired to ring.

Further, according to the conventional method disclosed in Japanese Patent No. 3055343, one off-hook detecting circuit is provided for one extension phone, and therefore the same problem as the above might occur.

Still further, in the conventional example explained above, when scheming to solve the aforementioned problems, there are required a means for detecting a polarity of the telephone line and a polarity matching means for matching the polarity of the telephone line with a polarity of the extension phone on the basis of the detected polarity. This configuration conduces to a problem of increasing the number of internal circuits of the apparatus and the costs thereof, enlarging a circuit space and causing a rise in the electric power of consumption.

CONVENTIONAL EXAMPLE 2

FIG. 14 is a block diagram showing an NCU 1200 used for a conventional facsimile apparatus FS11 to which the telephone set can be connected.

The NCU 1200 used for the conventional facsimile apparatus FS11 is, as illustrated in FIG. 14, provided with a DC power source 218 for exclusive use of detecting the off-hook of the telephone set.

Namely, during a period for which the facsimile apparatus FS11 is capturing the line and a period for which the facsimile apparatus FS11 sets the telephone set in a non-ringing state, the telephone set is disconnected from the line in order to eliminate an influence of the telephone set, and the dedicated DC power source 218 is provided for detecting the off-hook of the telephone set in this state also.

Next, an operation of the conventional facsimile apparatus FS11 will be discussed.

In a normal wait state, both of a CML relay 212 and an H relay 216 are switched OFF, and the telephone set connected to the terminal T1/T2 is connected with the line connected to the terminal L1/L2. Accordingly, when the telephone set is off-hooked, the current flows from the line, and the off-hook can be detected based on an output signal of a HOOK detector 215.

During the capture of the line, however, the CML relay 212 is switched ON, and the signal from the line is led to an interior of the FAX via a transformer 213. Therefore, during a wait for non-ringing setting (for preventing the telephone set connected to the terminal T1/T2 from ringing triggered by a CI signal), the H relay 216 is switched ON in order to restrain the telephone set from ringing triggered by the calling signal, so that the telephone set is disconnected from the line with the result that the hooking can not be detected based on the current flowing from the line.

Such being the case, in the facsimile apparatus FS11, a DC power source 218 for detecting the hooking is provided on the ON-side of the H relay 216, thereby detecting the hook-state on the basis of the current from the DC power source 218.

In the conventional facsimile apparatus FS11, however, the DC power source 218 is normally incorporated into a power unit, and a problem is that the DC power source 218 itself is a factor for increasing the costs of the power unit. Further, in the conventional facsimile apparatus FS11, a cable and a connector are needed for connecting the power unit to the NCU (network control circuit unit), and hence there arises a problem in which steps for connecting these components are required, and this is also a factor for further increasing the costs.

For eliminating those factors for raising the costs, there is proposed a circuit for detecting the hooking by use of a current from the line during the capture of the line and also during the waiting in the non-ringing setting.

According to the conventional facsimile apparatus FS11, however, the DC power source 218 is normally incorporated into the power unit, the problem is that the DC power source 218 itself is the factor for increasing the costs of the power unit. A further problem is that the connector is needed for connecting the power unit to the NCU (network control circuit unit), and steps for connecting these components are required, which causes a large increase in the costs.

SUMMARY OF THE INVENTION

It is a primary object of the present invention to provide a communication apparatus that can be actualized at low costs and can save its space in communication apparatuses that connect to an analog public line for communication.

It is therefore a major object of the present invention to decrease costs of the apparatus by executing a hook detection by utilizing a current from a line even during a capture of the line and during a wait in non-ringing call receipt setting (for preventing a telephone set connected to a terminal T1/T2 from ringing triggered by a CI signal).

It is another object of the present invention to remove an influence of the telephone set that is in the process of communications and dialing, which is to occur due to an execution of the hook detection using the current from the line.

It is still another object of the present invention to detect the hooking of the telephone set while eliminating the influence of the telephone set during the communications and the dialing, and to surely detect that the dialing is suspended midways.

It is a further object of the present invention to provide a communication apparatus having no DC power source dedicated for hook detection, capable of surely detecting a hook-state during off-hook dialing, and capable of eliminating mis-dialing in the case where when dialing is executed from a FAX side in an off-hook-state of the telephone set and a mistake is noticed in inputting a telephone number, a correct telephone number is entered after on-hooking/off-hooking of the telephone set.

DETAILED DESCRIPTION OF THE PREFERRED EMBODIMENTS

<First Embodiment>

Figure 1:
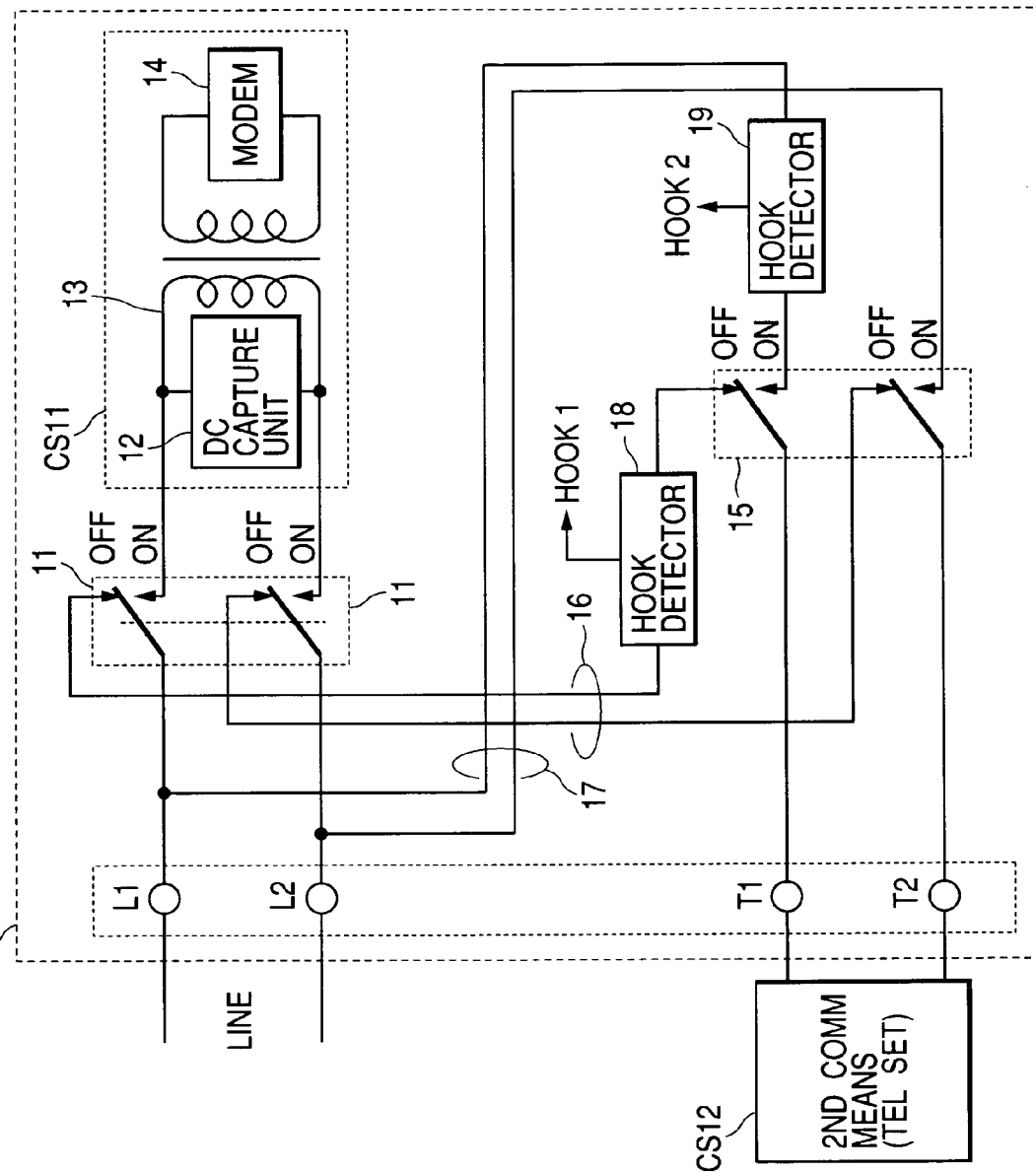
FIG. 1 is a circuit diagram showing a communication apparatus 100 according to a first embodiment of the present invention.

FIG. 1 is a block showing a communication apparatus 100 according to a first embodiment of the present invention.

The communication apparatus 100 includes a first communication means CS11 and further has a modular connector, etc., defined as a connecting means for connecting a second communication means CS12. The first communication means CS11 is defined as a communication means for performing, for example, facsimile communications. The second communication means CS12 is a telephone set.

The communication apparatus 100 is connected via two lines L1, L2 to an analog public line. The telephone set defined as the second communication means CS12 is connected to the communication apparatus 100 via two lines T1, T2 as a connecting means of the second communication means.

The facsimile apparatus as the communication apparatus 100 includes a CML relay 11, the first communication means CS11, an H relay 15, a first route means (or first path means) 16, a second route means (or second path means) 17, and HOOK detectors 18, 19. The first communication means CS11 has a DC capture unit 12, a transformer 13 and a MODEM 14.

The CML relay 11 is an example of a first switch means and connects, when connected to an OFF-side, the line to the telephone set side defined as the second communication means CS12. In the case of connecting the CML relay 11 to an ON-side, the line is connected to the MODEM 14 (which is herein a facsimile MODEM) defined as the first communication means. Namely, the CML relay 11 is connected to the OFF-side in a wait state where the facsimile apparatus remains non-operated and in a state where the telephone set is operating. The CML relay 11 is connected to the ON-side when the facsimile apparatus performs communications through the MODE 14.

The first route means 16 is a couple of wires for establishing a connection to the telephone set side via the CML relay 11 from L1, L2.

The transformer 13 transmits analog signals for communications. The DC capture unit 12 permits a DC current of the telephone line to flow, whereby an exchanger of a telephone office recognizes that the communication apparatus is establishing the connection of the line.

When the CML relay 11 is connected to the ON-side, the line is connected to the transformer 13 and the DC capture unit 12 that are defined as the first communication means CS11, and hence the facsimile apparatus becomes capable of the communications through the MODEM 14.

The H relay 15 is an example of a second switch means. The H relay 15 is a relay, connected between the CML relay 11 of the first route means 16 and the telephone set, for connecting the telephone set to any one of the first route means 16 and the second route means 17.

The second route means 17 is a route (or path) branching from L1, L2 for connecting the line, and connects L1, L2 to the H relay 15 through two wires. Accordingly, when the H relay 15 is connected to the OFF-side and when the CML relay 11 is connected to the OFF-side, the telephone set is connected to the line via the first route means 16. When the H relay 15 is connected to the ON-side, irrespective of which side the CML relay 11 is connected to, the telephone set can be connected to the line via the second route means 17.

The first HOOK detector 18 is connected between the CML relay 11 of the first route means 16 and the H relay 15. The first HOOK detector 18 executes a hook detection of the telephone set when the telephone set is connected to the line via the first route means 16.

The second HOOK detector 19 is connected between a branch point on the second route means 17 and the H relay 15. The second HOOK detector 19 executes the hook detection of the telephone set when the telephone set is connected to the line via the second route means 17.

Each of the first HOOK detector 18 and the second HOOK detector 19 is constructed of a current sensor, a current detection relay, etc. which utilize a photo coupler, a Hall-effect device or the like. A level of a HOOK1 signal outputted by the first HOOK detector 18 and a level of a HOOK2 signal outputted by the second HOOK detector 19, are determined depending on the DC current flowing therethrough. An unillustrated CPU of the first communication means CS11 checks the level of the HOOK1 signal and the level of the HOOK2 signal, and thus judges whether the telephone set is in an on-hook or off-hook-state.

Namely, when the telephone set is in the on-hook-state, the current flows through neither the first HOOK detector 18 nor the second HOOK detector 19, and hence the HOOK1 signal and the HOOK2 signal come to, for example, a Low level. On the other hand, when the telephone set is in the off-hook-state, the current flows through the first HOOK detector 18 (or the second HOOK detector 19), with the result that the HOOK1 signal (or the HOOK2 signal) becomes a High level in contrast with the above.

When the telephone set is off-hooked from the on-hook-state or is on-hooked from the off-hook-state, the level of the HOOK1 signal or of the HOOK2 signal change. But, a hook-state determining timer is provided for eliminating chattering of a hook switch of the telephone set and a delay of change in the current due to RC (resistance and capacitance) within the telephone set.

To be specific, when the HOOK1 signal or the HOOK2 signal changes to the High level from the Low level, the timer is started. If the High level continues without any interruption for, e.g., 500 ms, it is judged that a change from the on-hook-state to the off-hook-state is made in the telephone set.

If the first HOOK detector 18 and the second HOOK detector 19 are constructed of the photo couplers, this involves using bidirectional photo couplers that do not restrict the direction of the DC current. In the case of the current sensor and the current detection relay, the direction of the DC current is not likewise restricted.

Next, an operation of the embodiment discussed above will be explained.

In a wait state, the CML relay 11 is connected to the OFF-side, and therefore the hook detection of the telephone set can be attained even when the H relay 15 is connected to either the OFF-side or the ON-side. Namely, if the H relay 15 is connected to the OFF-side, it follows that the telephone set is connected to the first route 16. When the telephone set is in its off-hook-state, the current flowing via the first route 16 from the line further flows through the first HOOK detector 18, and the HOOK1 signal assumes the High level, whereby the off-hook of the telephone set can be detected.

As a matter of course, no current flows, and hence the HOOK1 signal comes to the Low level, whereby the on-hook can be detected. Furthermore, if the H relay 15 is connected to the ON-side, it follows that the telephone set is connected to the second route 17. When the telephone set is in its off-hook-state, the current flowing via the second route 17 from the line further flows through the second HOOK detector 19, and the HOOK2 signal takes the High level, whereby the off-hook of the telephone set can be detected.

As described above, when the telephone set is in the on-hook-state, the current does not flow, and consequently the HOOK2 signal comes to the Low level, whereby the on-hook can be detected.

Accordingly, the embodiment discussed above does not require a DC power source within the apparatus that has been required in the conventional apparatus, and does not therefore necessitate a noise eliminating circuit either, which should eliminate noises caused by the DC power source given above.

When the telephone set is off-hooked from the wait state, the CML relay 11 continues the off-connection, while the H relay 15 continues the off-connection or establishes the off-connection from the on-state and thus connects the telephone set to the line by connecting the telephone set to the first route means 16, thereby assuring the utility (speech) of the telephone set with no problem. At this time, in the case of detecting the on-hook of the telephone set, the first HOOK detector 18 detects the on-hook of the telephone set.

On the other hand, the CML relay 11 is connected to the ON-side, and, if necessary for detecting the hooking of the telephone set during some operation of the facsimile apparatus, the H relay 15 is connected invariably to the ON-side while the telephone set is connected to the second route means 17.

The H relay 15 is connected to invariably to the ON-side to connect the telephone set to the second route means 17, in cases such as when the facsimile apparatus is provided with a hook key and this hook key is pressed to set the CML relay to the on-state; before dialing after switching on the CML relay 11 in order for the facsimile apparatus to enter a dial operation; after switching on the CML relay 11 in order to detect a CNG signal after a calling signal has arrived in a FAX/TEL selection mode; when outputting a dial signal from the facsimile apparatus in the off-hook state of the telephone set; when outputting a hang-on tone and a voice answering signal from the MODEM 14 by switching on the CML relay 11; and so on.

Accordingly, when the telephone set is in the off-hook-state, the current flowing via the second route means 17 from the line is made to flow through the second HOOK detector 19, thereby making it possible to detect the off-hook of the telephone set. As a matter of course, the current does not flow through the second HOOK detector 19 when the telephone set is in the on-hook-state, whereby the on-hook can be detected.

Further, the following case is given as the operation of the first embodiment.

If required for detecting the hooking of the telephone set when the CML relay 11 is kept on, the telephone set is connected to the second route means 17 by switching on the H relay 15, and the hook detection is carried out. In this state, however, if the telephone set is off-hooked and an influence is exerted on the operation of the facsimile apparatus, the telephone set is disconnected from the second route means. 17 by switching off the H relay 15, thus disconnecting the telephone set from the line. For instance, the telephone set and the facsimile apparatus are connected in parallel to the line, there changes a characteristic on the side of the facsimile apparatus, and the operation of the facsimile apparatus is influenced. In this case, when the facsimile apparatus is in the process of performing the communications and transmitting the dial signal, the H relay 15 is switched off, and the telephone set is disconnected from the second route means 17.

As described above, the first HOOK detector 18 is attached to the first route means 16 and the second HOOK detector 19 is attached to the second route means 17; these detectors are further structured as follows.

The first HOOK detector 18 exists on the first route means 16 to be connected when the telephone set is in a state of being used, and hence a current value that meets the aforementioned standards and besides serves to detect the off-hook of the telephone set, is set to approximately 5 through 10 mA in order to assure the specifications of the telephone set. Accordingly, as there are no influences on the facsimile communications and dialing in the facsimile apparatus, the inexpensive photo coupler, etc. can be utilized as the first HOOK detector 18.

On the other hand, the second HOOK detector 19, if required for detecting the hooking of the telephone set when the CML relay 11 is kept on, might detect the hooking by connecting the telephone set to the second route means 17, and is therefore structured as follows.

Namely, when the CML relay 11 is kept on, the telephone set is connected to the second route means 17, and the telephone set is off-hooked, resulting in such a state that the DC capture unit 12 of the facsimile apparatus and the telephone set are connected in parallel. At this time, if a DC impedance of the DC capture unit 12 is smaller than that of the telephone set. In this case also, there is a necessity of detecting the hooking. Accordingly, the second HOOK detector 19 is, even when the current flowing to the telephone set is a small current, structured to detect the off-hook. To be specific, the second HOOK detector 19 is structured to judge that the telephone set is off-hooked in a case where the current on the order of several hundreds of microamperes (μA) through 1 mA flows to the telephone set.

Even if the second HOOK detector 19 is structured to detect the off-hook of the telephone set on the basis of the small current, as described above, the timer determining means is provided, and hence when the timer comes to a full status and is going to determine, the capacitor within the telephone set is sufficiently charged therefore, even when the line is connected to the telephone set by switching over the CML relay 11 to the off-state from the on-state, it does not happen that the exchanger of the telephone office detects the on-hook by mistake due to a cut-off of the line current.

As the detection of the hooking of the telephone set involves using the second route means 17, in a state where the telephone set is connected to the second route means 17 including the second HOOK detector 19, there is no necessity of meeting the standards described above, and it is possible to actualize the small current serving to detect the off-hook. The second HOOK detector 19 is connected so as not to exert any influence on the facsimile communications, the dialing, etc. by the facsimile apparatus, and therefore the inexpensive photo coupler can be utilized.

Herein, an unillustrated control means such as a CPU, etc. of the facsimile apparatus controls the variety of relays given above.

<Second Embodiment>

Figure 2:
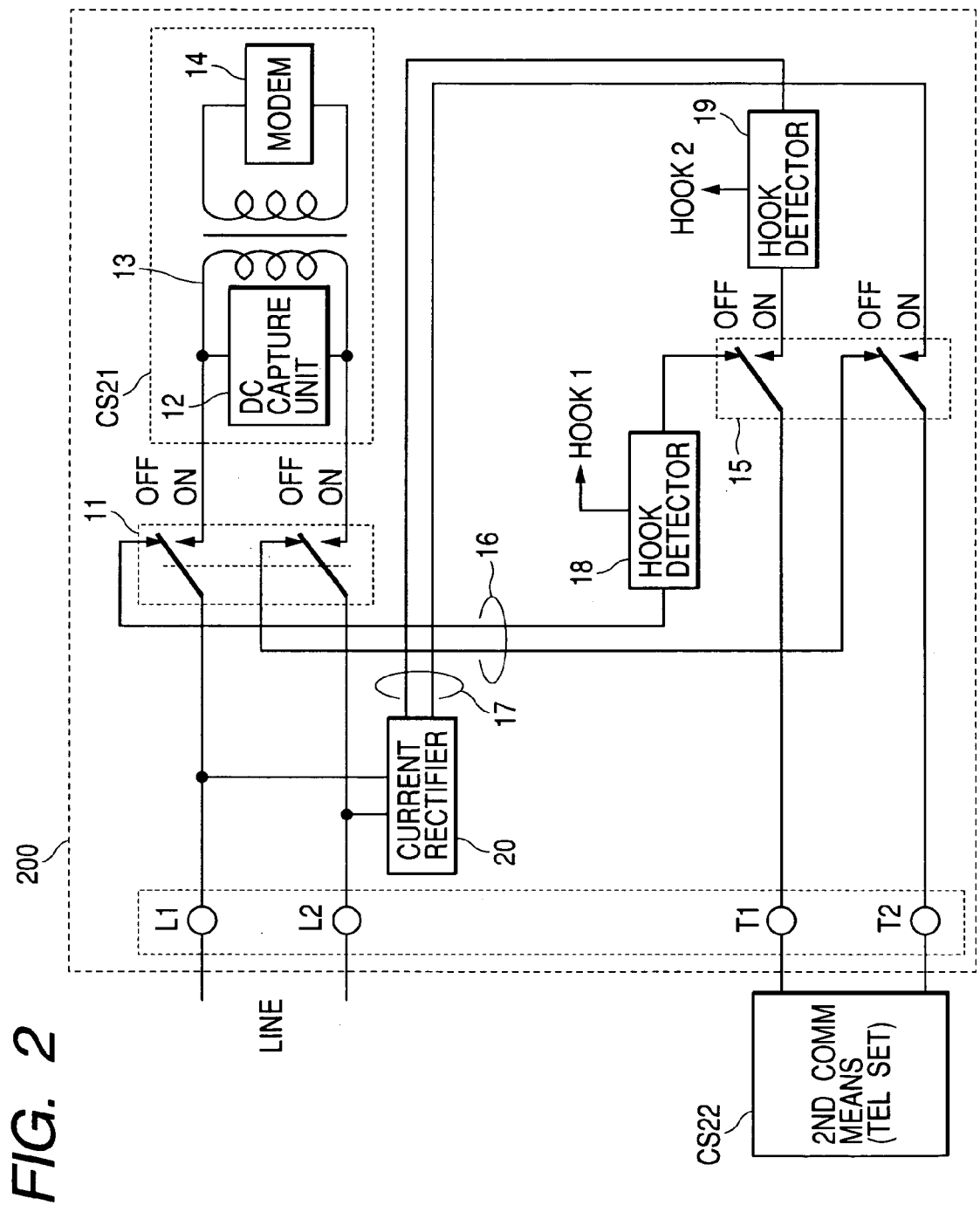
FIG. 2 is a circuit diagram showing a communication apparatus 200 according to a second embodiment of the present invention.

FIG. 2 is a block diagram showing a communication apparatus 200 according to a second embodiment of the present invention.

The communication apparatus 200 includes a first communication means CS21 and further has a modular connector, etc., defined as a connecting means for connecting a second communication means CS22. The first communication means CS21 is defined as a communication means for performing, for example, the facsimile communications. The second communication means CS22 is a telephone set as the second communication means CS12.

Moreover, the second route means 17 of the communication apparatus 200 has a current rectifier 20. The current rectifier 20 exists on the second route means 17 and is provided closer to the line than the H relay 15.

Figure 3:
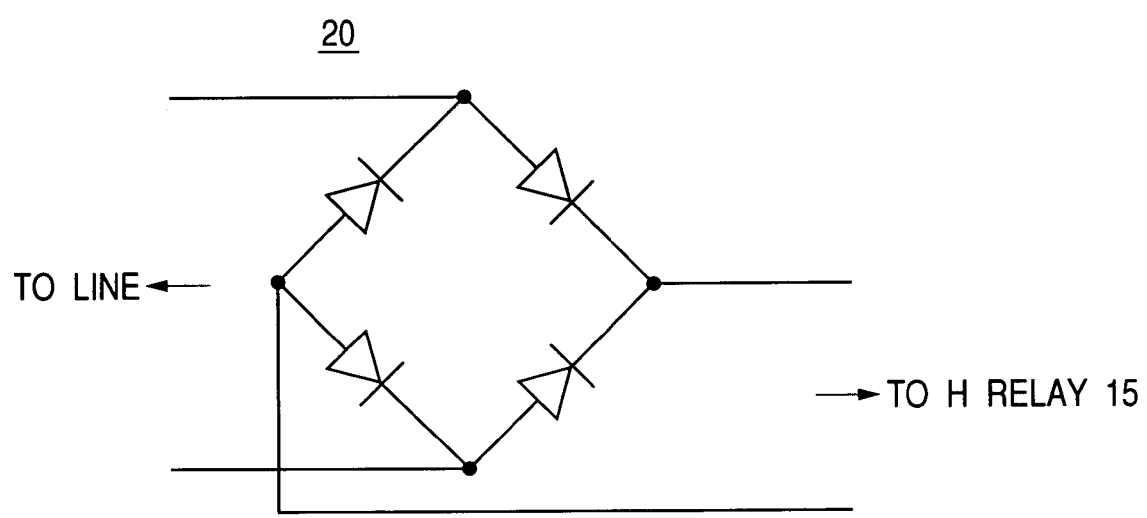
FIG. 3 is a circuit diagram showing one example of a current rectifier 20.

FIG. 3 is a circuit diagram showing one example of the current rectifier 20.

The current rectifier 20 uses, as illustrated in FIG. 3, four pieces of unidirectional devices (e.g., diodes). In this current rectifier 20, anode and cathode connecting terminals of the diodes with no polarity are connected to the line-side, while an anode connecting terminal (−) and a cathode connecting terminal (+) each exhibiting a polarity are connected to the side of the H relay 15. With this contrivance, the unidirectional DC current can be obtained on the side of the H relay 15 without depending on the polarity of the DC current flowing from the line, and the Hook detection by the second HOOK detector 19 can be actualized without any problem.

In particular, the second HOOK detector 19 is disposed closer to the H relay 15 than the current rectifier 19, and hence the direction of the DC current through the line becomes fixed. Accordingly, the unidirectional photo coupler can be utilized, and costs can be reduced down owing to the bidirectional photo coupler. The current sensor and the DC detection relay have likewise no limit in the direction of the DC current and can be, even if limited in terms of the direction of the DC current, each used as the second HOOK detector 19.

Further, when the facsimile apparatus as the communication apparatus 200 is in its wait state, the telephone set as the second communication means CS22 is connected to the second route means 17 by switching on the H relay 15. Hereupon, even when a calling signal having positive and negative voltage levels of 15 Hz to 60 Hz arrives from the line, the current rectifier 20 rectifies this signal into a half-wave assuming only the positive voltage level, thereby invalidating the calling signal with the result that a ringer provided inside the telephone set does not ring. Namely, even if there is not provided the DC power source that has hitherto been provided inside the facsimile apparatus in the conventional apparatus, the calling signal can be invalidated without the telephone set's ringing in the state of being connected to the line.

While on the other hand, when in the wait state, the H relay 15 is switched off, and the telephone set is connected to the first route means 16. Hereupon, the calling signal arrived from the line reaches directly the telephone set, and the telephone set rings with no problem.

The connection of the H relay 15 in the wait state is based on initialization of the facsimile apparatus.

As described above, the current rectifier 20 is provided on the second route means 17, and hence even if the calling signal arrives just when switching on the H relay 15, the telephone set does not ring. Further, the current rectifier 20 is constructed by using the four pieces of unidirectional devices, so that the off-hook of the telephone set can be detected with no problem without adding any extra circuits irrespective of the direction of the DC current of the line.

<Third Embodiment>

Figure 4:
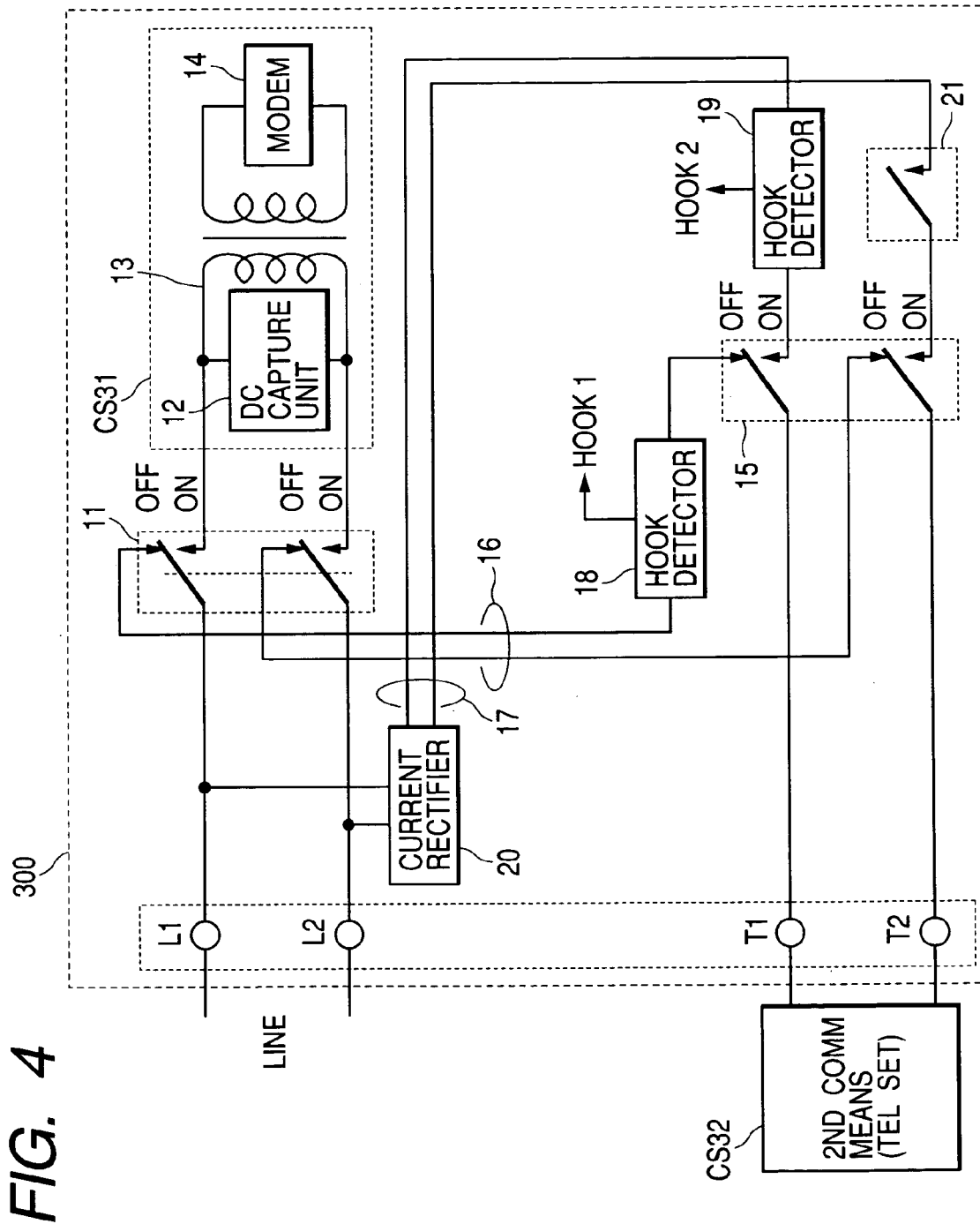
FIG. 4 is a circuit diagram showing a communication apparatus 300 according to a third embodiment of the present invention.

FIG. 4 is a block diagram showing a communication apparatus 300 according to a third embodiment of the present invention.

The communication apparatus 300 includes a first communication means CS31 and further has a modular connector, etc., defined as a connecting means for connecting a second communication means CS32. The first communication means CS31 is defined as a communication means for performing, for example, the facsimile communications. The second communication means CS32 is a telephone set as the second communication means CS12.

Moreover, the second route means 17 of the communication apparatus 300 has an H detection relay 21. The H detection relay 21 exists on the second route means 17 and is provided closer to the line than the H relay 15 in the communication apparatus 300. In the communication apparatus 300, the H detection relay 21 is attached to one of two wires and may also be attached to both of the two wires.

When switching on the H detection relay 21, the second route means 17 is connected. When switching off the H relay 21, the second route means 17 is disconnected. Other configurations are the same as those in the communication apparatus 200.

Next, a control operation in the communication apparatus 300 will be explained.

If required for detecting the hooking of the telephone set as the second communication means CS32 when the CML relay 11 is kept on, the telephone set is connected to the second route means 17 by switching on the H relay 15, and the second HOOK detector 19 detects the hooking. In the state where the telephone set is off-hooked and an influence exerts on the operation of the facsimile communication means as the first communication means CS31, if necessary for switching on the H relay 15, the H detection relay 21 is switched off and the second route means 17 is disconnected. Namely, the telephone set is separated from the line.

For instance, the telephone set as the second communication means CS32 and the facsimile communication means as the first communication means CS31, are connected in parallel to the line, and the characteristic on the side of the facsimile apparatus changes large enough to exert the influence on the operation thereof. In this case, for example, when the facsimile apparatus is in the process of performing the communications and transmitting the dial signal, the H detection relay 21 is switched off, and the second route means 17 is disconnected.

According to the communication apparatus 300, as discussed above, the H detection relay 21 is provided and is capable of separating the second route means 17. Therefore, even when the telephone set is off-hooked in the case where the facsimile apparatus is in the process of performing the communications and transmitting the dial signal, the telephone set can be separated from the line so as not to cause the influence due to the aforementioned operation of the telephone set.

Further, as explained above, in the case of switching off the H relay 15 as a substitute for the H detection relay 21, the H relay 15, if constructed as a mechanical relay, emits a large switchover noise that might, if frequently switched over, get on the user's nerves. Hence, if controlled by providing the H detection relay 21, the H relay 15 becomes capable of keeping its on-state and does not emit, even if constructed as the mechanical relay, the switchover noise thereof.

Herein, the control of the variety of relays is conducted by the unillustrated control means such as the CPU, etc. of the facsimile apparatus.

<Fourth Embodiment>

Figure 5:
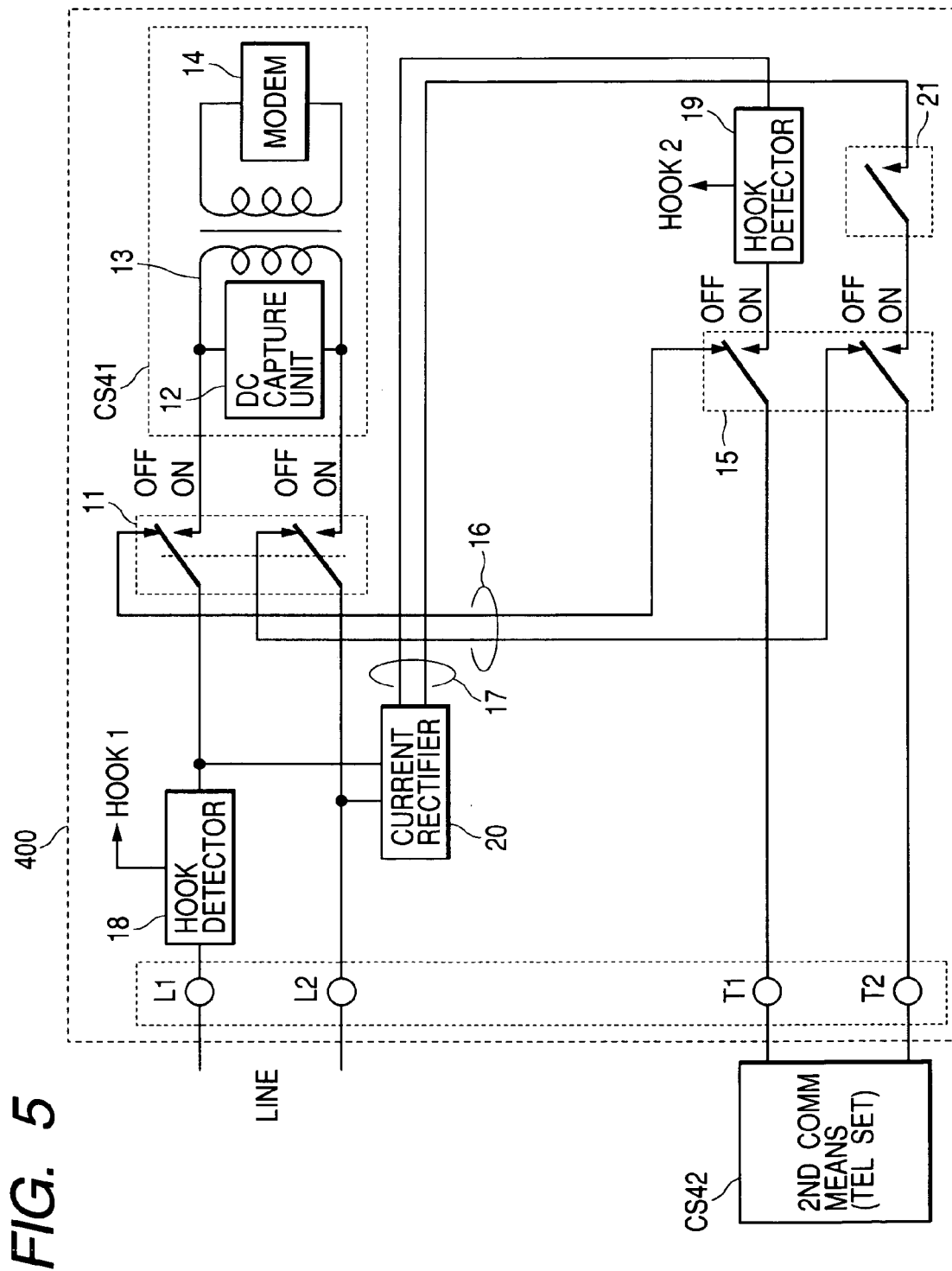
FIG. 5 is a circuit diagram showing a communication apparatus 400 according to a fourth embodiment of the present invention.
Figure 6:
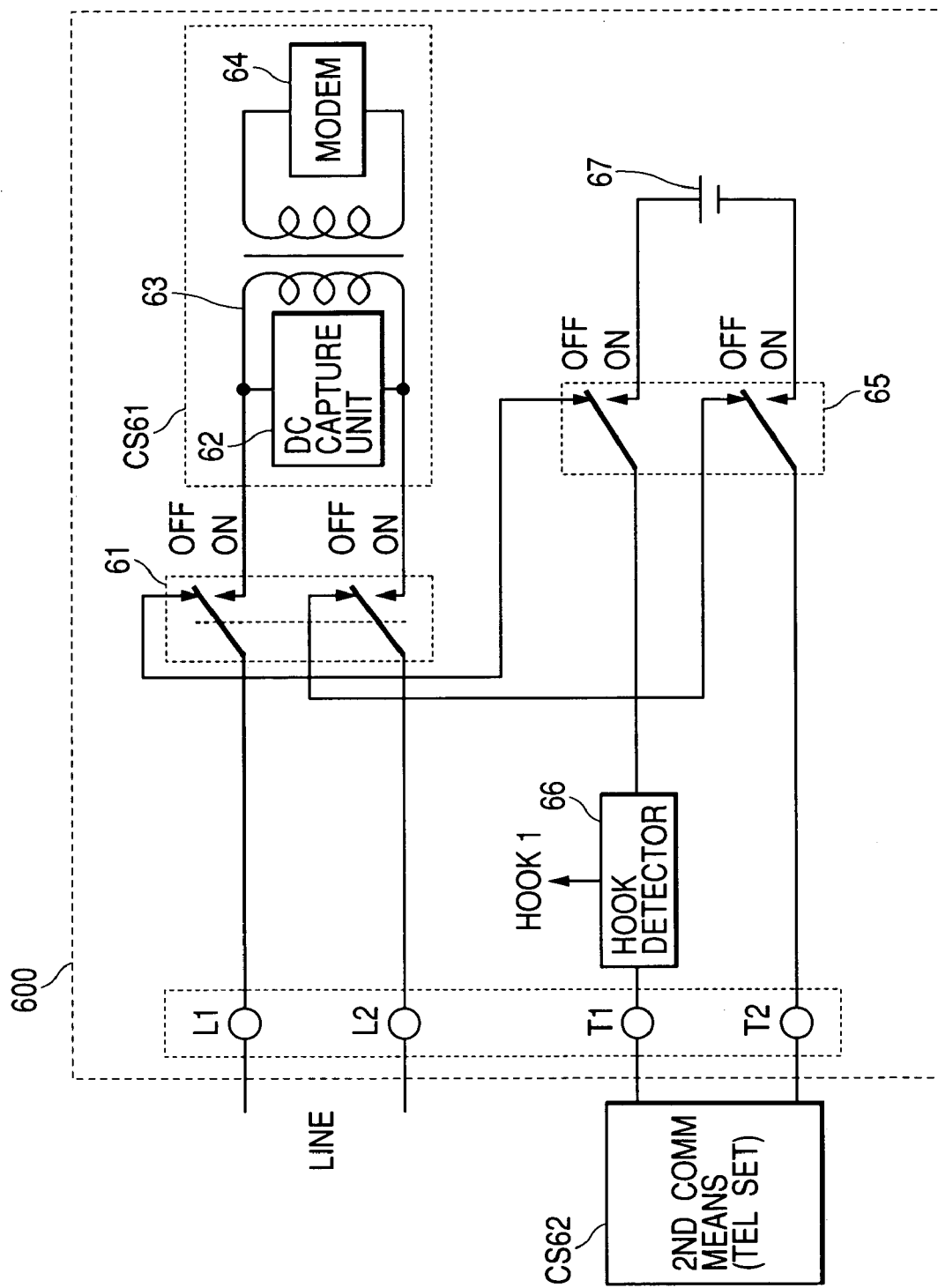
FIG. 6 is a diagram showing a conventional communication apparatus 600.

FIG. 5 is a circuit diagram showing a communication apparatus 400 according to a fourth embodiment of the present invention.

The communication apparatus 400 includes a first communication means CS41 and further has, e.g., a modular connector, etc., defined as a connecting means for connecting a second communication means CS42. The first communication means CS41 is defined as a communication means for performing, for example, the facsimile communications. In the communication apparatus 400, the first communication means CS41 is a device including the first HOOK detector 18 shifted to between L1, L2 for connecting the line and the CML relay 11. The second communication means CS42 is a telephone set as the second communication means CS32.

Other configurations and operations are the same as those explained in the communication apparatuses 100, 200, 300, wherein there is no problem even when connecting the first HOOK detector 18 to the position shown in FIG. 5, and the same effect as the above-mentioned can be acquired.

In the communication apparatus 400, the first HOOK detector 18 is connected onto the route where the facsimile operations such as the facsimile communications, dialing and so forth are performed, and is therefore constructed to meet the characteristics thereof, i.e., constructed so as to exert no influence on the DC characteristic and the AC characteristic.

In this case, the standards (such as an insertion loss, a series DC resistance, etc.) for the telephone set can be easily met. For instance, it is possible to utilize the current sensor and the current detection relay that use the Hall-effect devices for the first HOOK detector 18. In this case, whether the line current flows or not can be detected also in the operation state of the first communication means with the first switch means kept on.

Herein, the control of the variety of relays is conducted by the unillustrated control means such as the CPU, etc. of the facsimile apparatus.

In the communication apparatuses 100, 200, 300, 400, the CML relay 11 and the H relay 15 are two-circuit relays where the two circuits operate simultaneously, however, two pieces of one-circuit relays may also be used in place of the former relays.

According to the present invention, the two types of hook detection means can be provided for detecting the hooking of the second communication means. For example, there can be separately utilized detectors having characteristics depending on applications such as those having different hook detection sensitivities, and so on.

Further, particularly the first route means is connected and used during the operation of the second communication means, and the second route means can be used only when detecting the hooking of the second communication means. Therefore, in the state where the second communication means is connected to the second route means including the second hook detection means, there is eliminated the necessity of meeting other standards required on condition that only the hooking of the second communication means can be detected. Hence, the second hook detection means can be constructed of an inexpensive piece of hardware (for example, the photo coupler, etc.). Further, it is possible to actualize the inexpensive downsized communication apparatus consuming a smaller amount of electricity, wherein it is not required that the interior of the first communication means be provided with the dedicated DC power source that has hitherto been provided in the conventional apparatus, and therefore no noise is generated from this dedicated DC power source.

Further, according to the present invention, when the second switch means connects the second communication means to the first route means, the first hook detection means detects the hook-state of the second communication means. When the second switch means connects the second communication means to the second route means, the second hook detection means detects the hook-state of the second communication means. Therefore, the hooking of the second communication means can be detected from the line current either in the wait state or the operation state of the first communication means. For example, in the state where the first communication means is not connected to the line, either the first hook detection means or the second hook detection means is capable of detecting the hooking of the second communication means. Moreover, if necessary for detecting the hooking of the second communication means even in the state where the first communication means is connected to the line side, the hooking thereof can be easily detected by the second hook detection means.

Furthermore, according to the present invention, the first hook detection means is connected between the first switch means on the first route means and the second switch means, and therefore this position has no influence on the communications and the dialing, etc. in the communication apparatus. It may be sufficient to meet only the characteristic of connecting the line to the second communication means and the hook detecting condition, so the first hook detection means can be constructed of the inexpensive piece of hardware (the photo coupler, etc.).

Then, according to the present invention, the first hook detection means is connected between the telephone line and the first switch means and is therefore capable of detecting whether the line current flows or not even in the operation state of the first communication means with the first switch means kept on.

Moreover, according to the present invention, since the off-hook detection current value of the second hook detection means is smaller than the off-hook detection current value of the first hook detection means, the off-hook can be detected without any problem even if the current serving to detect the off-hook is small depending on the line condition.

Further, according to the present invention, the first communication means includes the timer determining means for judging, when the output of the hook detection means changes, that the hook-state has changed after a fixed period of time since the output changes. It is therefore feasible to eliminate the chattering of the hook switch of the second communication means and the delay of change in the current due to RC (resistance and capacitance) within the second communication means. Especially, even when the off-hook detection current is small and the capacitor inside the second communication means has not been sufficiently charged, the capacitor is amply charged after a time of the timer has elapsed. Thus, at this time even when the line is reconnected to the second communication means from the first communication means, there is less possibility that the line is disconnected.

Then, according to the present invention, the current rectifying means constructed of four pieces of unidirectional devices is provided between the telephone line of the second route means and the second switch means, and therefore the hook detection of the second communication means through the second route means can be executed with no problem without adding any extra circuit. The second hook detection means may detect the unidirectional current, and the current detector for the unidirectional detection is employed for the hook detection means, which leads to a decrease in costs. Besides, the calling signal arrived can be converted into the half-wave, and the calling of the second communication means can be invalidated.

Moreover, according to the present invention, there is provided the means for connecting the second switch means to the first route means when the first switch means is connected to the side of the first communication means. Therefore, even when the first switch means is connected to the side of the first communication means, it is possible to cut the connection between the telephone set and the second route means or the line as the necessity may arise. The off-hook operation of the second communication means does not exert the influence on the operation of the first communication means.

Further, according to the present invention, the second route means includes the third switch means between the telephone line and the second switch means. The third switch means is a means for connecting and disconnecting the second route means and is therefore capable of cutting the connection between the telephone set and the second route means or the line while the second switch means is kept on as the necessity may arise, so that the off-hook operation of the second communication means does not affect the operation of the operation of the first communication means.

Then, according to the present invention, when the second switch means is connected to the second route means, in the case of detecting the hook-state of the second communication means, the third switch means is set in a second route means connecting state. Therefore, if necessary for detecting the hook-state when the second switch means is connected to the second route means, the second communication means is connected to the line by connecting the third switch means. Therefore, the current flowing from the line can be made to flow even when the second communication means is off-hooked, whereby the hook detection of the second communication means can be executed with no problem.

Further, according to the present invention, the first switch means is connected to the first communication means, and, during the operation of the first communication means, the third switch means disconnects the second route means. Accordingly, even when the first switch means operates to connect the first communication means to the circuit side, it is possible to cut off the connection between the second communication means and the second route means or the line while the second switch means is kept on as the necessity may arise. Therefore, the off-hook operation of the second communication means does not affect the operation of the operation of the first communication means.

Moreover, according to the present invention, the first communication means involves the use of the MODEM, and the second communication means is the telephone set, so that a data communication apparatus can be utilized as the first communication means in place of the facsimile apparatus.

The present invention exhibits such an effect that the communication apparatus utilized by its being connected to the analog public line can be actualized in a manner that reduces its costs and saves its space.

<Fifth Embodiment>

Figure 7:
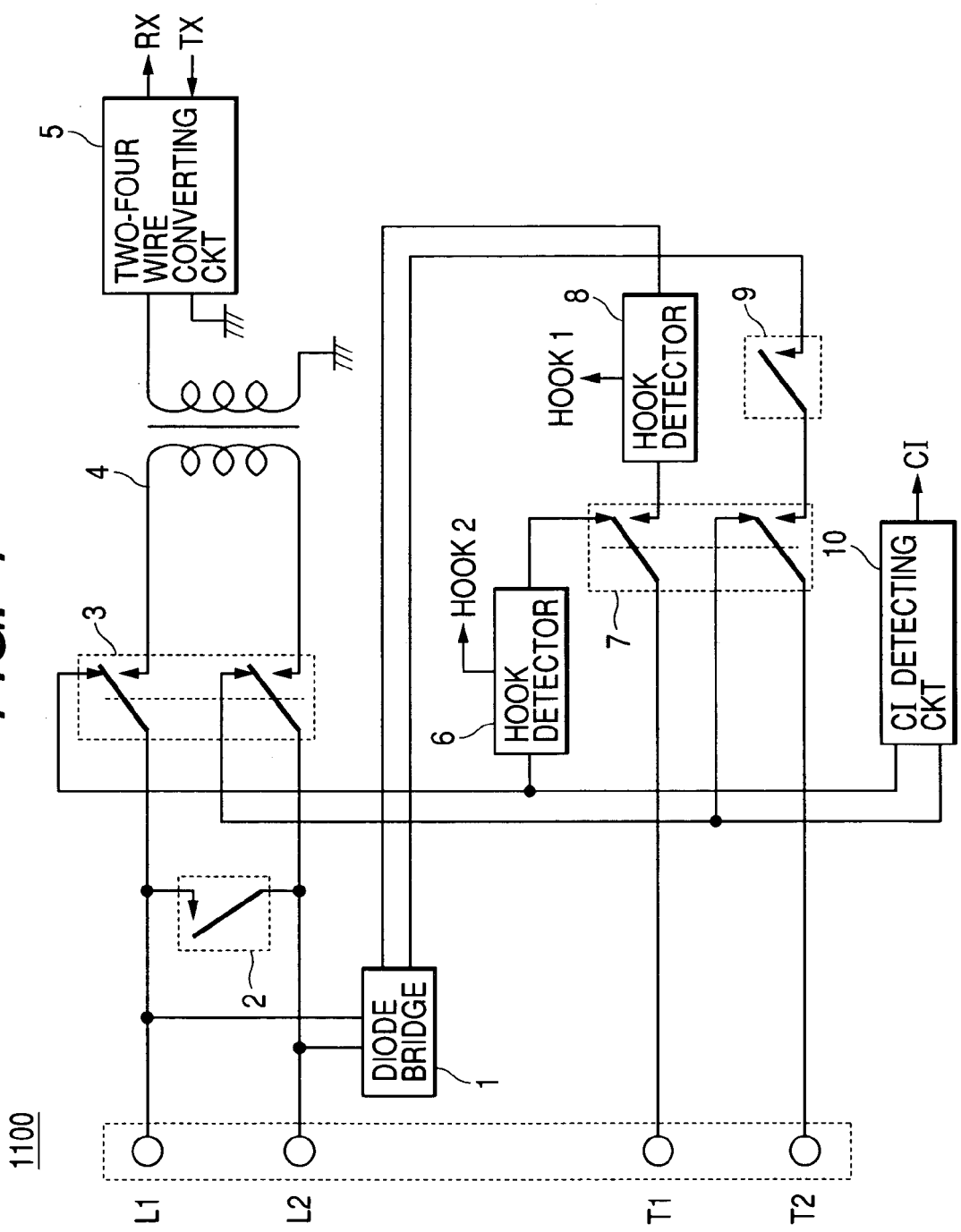
FIG. 7 is a block diagram showing an NCU 100 used for a facsimile apparatus FS1 according to one embodiment of the present invention.

FIG. 7 is a block diagram showing an NCU 100 employed for a facsimile apparatus FS1 according to one embodiment of the present invention.

The fifth embodiment will exemplify a facsimile apparatus and may be applied to any communication apparatus other than the facsimile apparatus on condition that the telephone set be connectable to the communication apparatus.

The symbols L1 and L2 represent terminals for connecting the telephone line, and T1 and T2 are terminals for connecting a communication apparatus such as the telephone set or a handset of the telephone set, etc. to the facsimile apparatus FS1.

The NCU 100 is a network control circuit used for the facsimile apparatus FS1 and includes a diode bridge 1, a P relay 2, a CML relay 3, a transformer 4, a two-four wire converting circuit 5, HOOK detectors 6 and 8, an H relay 7, an H detection relay 9 and an CI detecting circuit 10.

The diode bridge 1 is a diode bridge for rectifying a signal transmitted from the telephone line connected to the terminals L1/L2 and establishing a connection to the H detection relay 9. The signal from the line is converted into a DC voltage by the bridge 1, and hence, even when the telephone line is connected to the telephone set, it does not happen that the telephone set rings in response to a calling signal. Further, since the diode bridge 1 is disposed in a position closer to the terminals L1/L2 of the telephone line than the CML relay 3, when the telephone set is off-hooked even if the CML relay 3 is in an off-state (which implies that the facsimile apparatus FS1 is disconnected from the telephone line), the off-hook can be surely detected from a line current.

The P relay 2 is a relay for transmitting a dial pulse. The CML relay 3 is a relay for capturing or disconnecting the line. The transformer 4 is a transformer for forming a DC loop, capturing the line and taking in an AC component.

The two-four wire converting circuit 5 is a circuit for executing a two-four wire conversion of the signal received via the transformer 4. Through this two-four wire converting circuit 5, the signal can be transmitted and received between the line and the unillustrated MODEM existing in the facsimile apparatus FS1.

The HOOK detector 6 is a HOOK detector for detecting the hook-state when both of the CML relay 3 and the H relay 7 are switched OFF. The HOOK detector 6 performs the hook detection by use of the current flowing from the telephone line L1/L2. In this configuration, the line current flows to the HOOK detector 6, whereby the off-hook of the telephone set connected to the terminal T1/T2 can be detected.

The H relay 7 is a relay for switching over the telephone set connected to the T1/T2 to the line via the CML relay 3 or the H detection relay 9.

The HOOK detector 8 is a HOOK detector for detecting the hooking when both of the H relay 7 and the H detection relay 9 are switched ON. The HOOK detector 8 performs the hook detection by use of the current flowing from the telephone line L1/L2. In this configuration, the line current flows to the HOOK detector 8, whereby the off-hook of the telephone set connected to the terminal T1/T2 can be detected.

The H detection relay 9 is a relay for connecting the signal transmitted via the diode bridge 1 to the H relay 7. The H detection relay 9 is a relay for switching over a state of whether the HOOK detector 8 performs the hook detection or not when the H relay 7 is switched OFF. When the H detection relay 9 is switched OFF, the line HOOK detector 8 does not effect the hook detection.

The CI detecting circuit 10 is a detection circuit for detecting the calling signal from the line.

Figure 14:
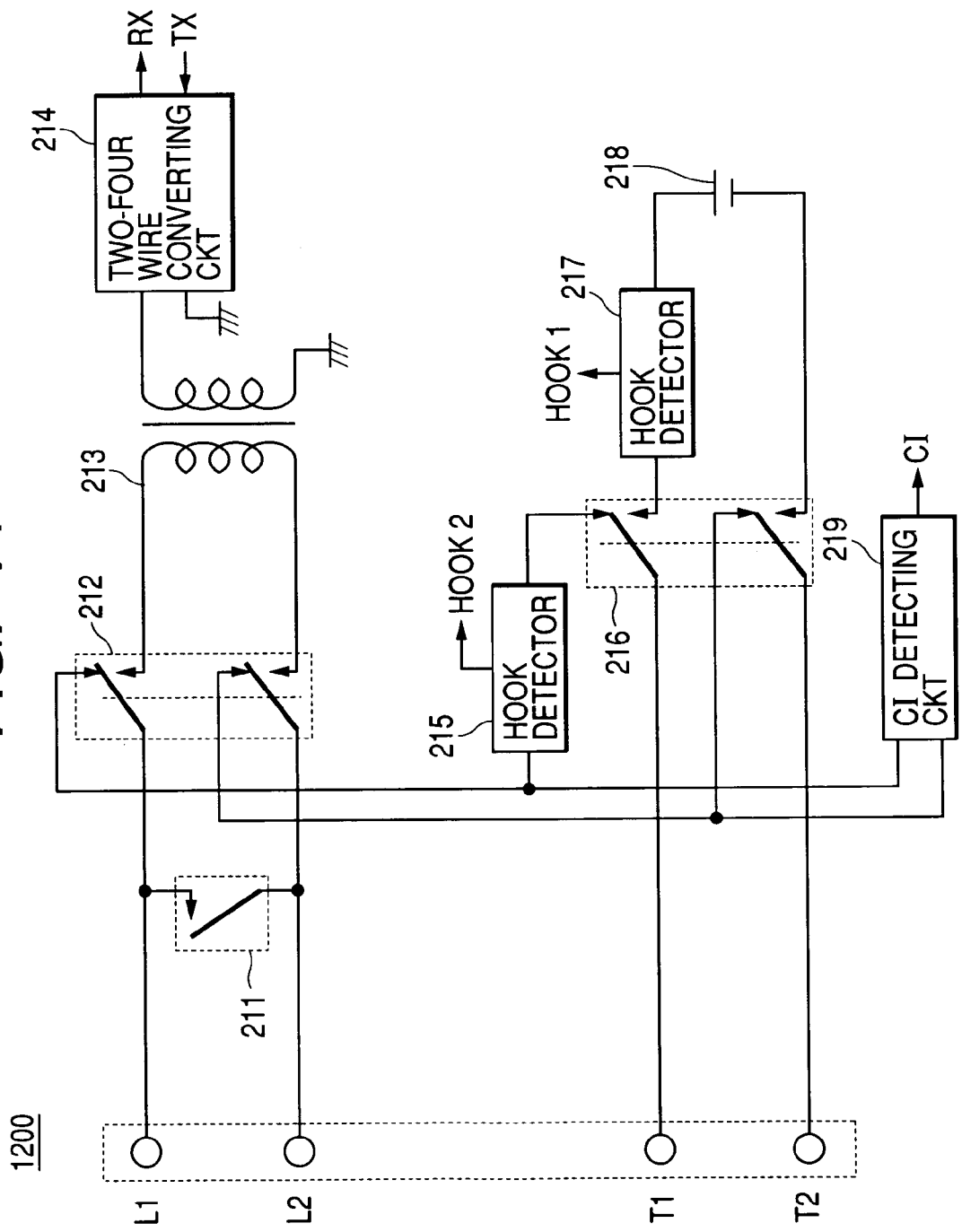
FIG. 14 is a block diagram showing an NCU 1200 used for a conventional facsimile apparatus FS11 to which a telephone set can be connected.

The NCU 100 includes the diode bridge 1 and the H detection relay 9 in place of the DC power source 218 shown in FIG. 14, and supplies the current from the terminal L1/L2 to the ON-side of the H relay through the diode bridge 1 and the H detection relay 9.

With this configuration, as will be described alter on, even when the calling signal reaches, the telephone set connected to the terminal T1/T2 does not ring.

Figure 8:
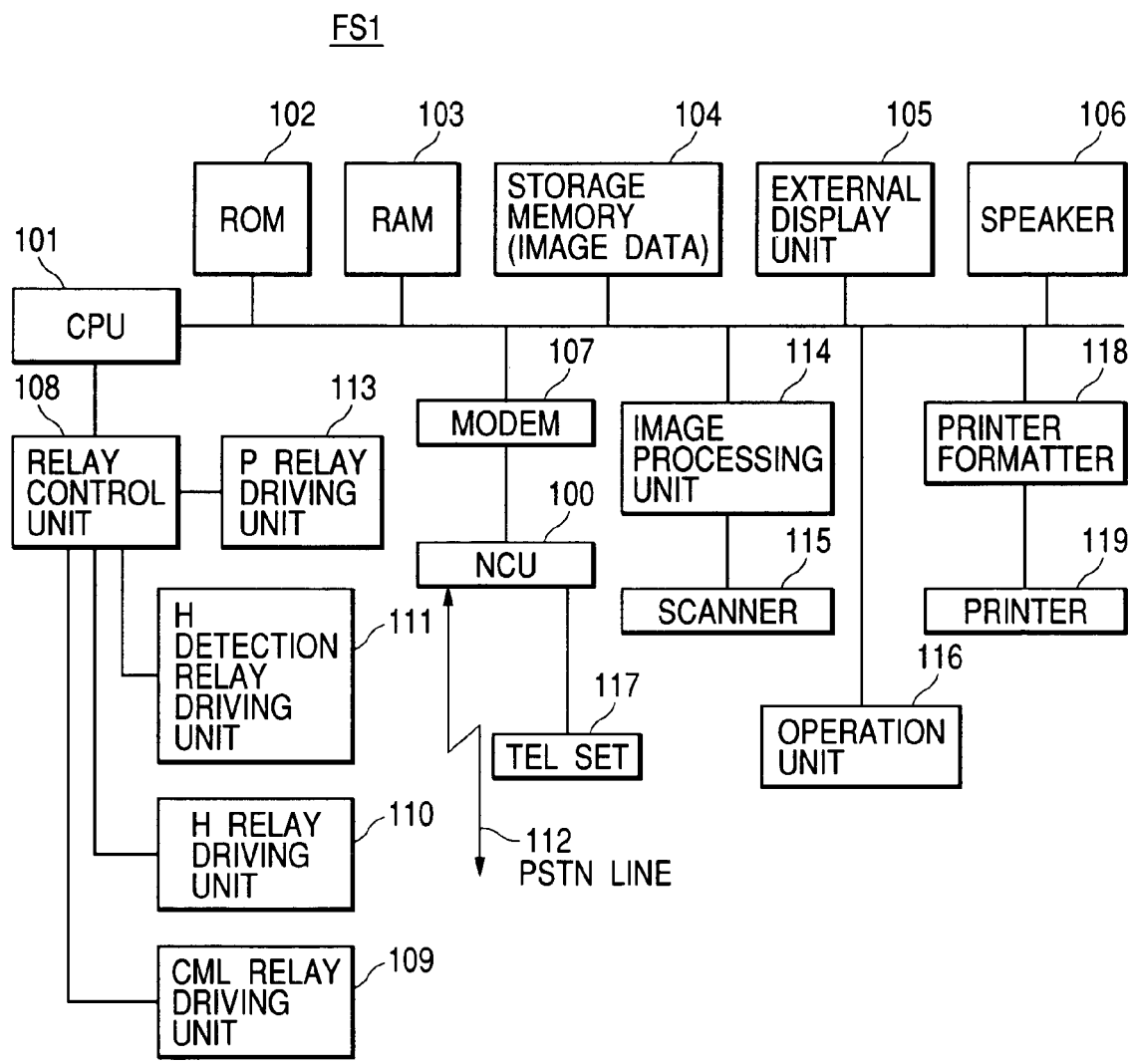
FIG. 8 is a block diagram showing a configuration of the facsimile apparatus FS1 as one embodiment of the present invention.

FIG. 8 is a block diagram showing a configuration of the facsimile apparatus FS1 in one embodiment of the present invention.

Referring to FIG. 8, an NCU 100 is the same as the NCU 100 shown in FIG. 7.

A CPU 101 is a system control unit and controls the whole apparatus. A ROM 102 serves to store a control program of the CPU 101. A RAM 103 is constructed of an SRAM (Static Random Access Memory), etc. and serves to store program control variables, etc. Further, the RAM 103 is stored with telephone set numbers of destinations and e-mail addresses of transmission destinations that have been registered by an operator, various setting values, pieces of management data of the apparatus and buffers (files) for a variety of works.

A storage memory 104 is constructed of a DRAM (Dynamic RAM) and serves to store image data. An external display unit 105 is constructed of an LCD (Liquid Crystal Display), an LED (Light Emitting Diode), etc. and serves to notify a user of information by displaying. A speaker 106 gives a voice notification and a voice alarm to the user, and monitors a signal tone transmitted and received via a PSTN line 112. The speaker 106 has a built-in speaker control unit for switching ON and OFF the speaker.

A MODEM 107 modulates and demodulates the transmitted/received signals of the facsimile, and has a function of generating a selection signal (tone dialer). Further, the MODEM 107 configures a communication unit (to which the CPU 101, the ROM 102, the RAM 103, the storage memory 104, etc. may be added according to the necessity). A pulse dial is generated by the P relay shown in FIG. 7.

The NCU 100 has a function of transmitting the selection signal (the dial pulse or the tone dialer) to the PSTN line (analog public line network) 112, and executes an auto call receiving operation based on the detection of the calling signal. Further, the NCU 100 establishes a connection of a telephone set 117 (which may be a handset of the telephone set) through the T1/T2 terminal shown in FIG. 7. The NCU 100 switches ON/OFF the variety of relays in accordance with instructions of the CPU 101 in response to the detected calling signal and a hook detection signal.

A relay control unit 108 controls the variety of relays illustrated in FIG. 7. The numeral 109 designates a CML relay driving unit for driving the CML relay. The numeral 110 represents an H relay driving unit for driving the H relay. The numeral 111 denotes an H detection relay driving unit for driving the H detection relay, and 113 stands for a P relay driving unit for driving the P relay that generates the dial pulse.

An image processing unit 114 effects correction processing on image data as read and outputs fine image data. A scanner 115, which is constructed of a CS image sensor, an original carry mechanism, etc., optically reads the original and converts thus read data into electrical image data. An operation unit 116 is constructed of a keyboard, a touch panel, etc. and is used for an operator to perform a variety of input operations. Herein, the operation unit 116 has, in addition to an operating portion for dialing, operating portions capable of setting a ringing wait state, a non-ringing wait state and, as states when receiving the call, an F/T selection state, an auto receiving state, a manual receiving state and so on.

A printer formatter 118, on the occasion of printing file data from a PC, a workstation and en external appliance, analyzes a printer description language and converts the data into the image data. A printer 119 is an apparatus for recording the received image and the file data on a sheet of recording paper.

Next, a method of utilizing the NCU 100 will briefly be explained.

The CPU 101 executes the program stored on the ROM 102, thereby conducting the following operations. The CPU 101 controls the CML relay driving unit 109, the H relay driving unit 110 and the H detection relay driving unit 111 through the relay control unit 108, thereby executing ON/OFF control of the CML relay, the H relay, the H detection relay and the P relay.

Figure 9:
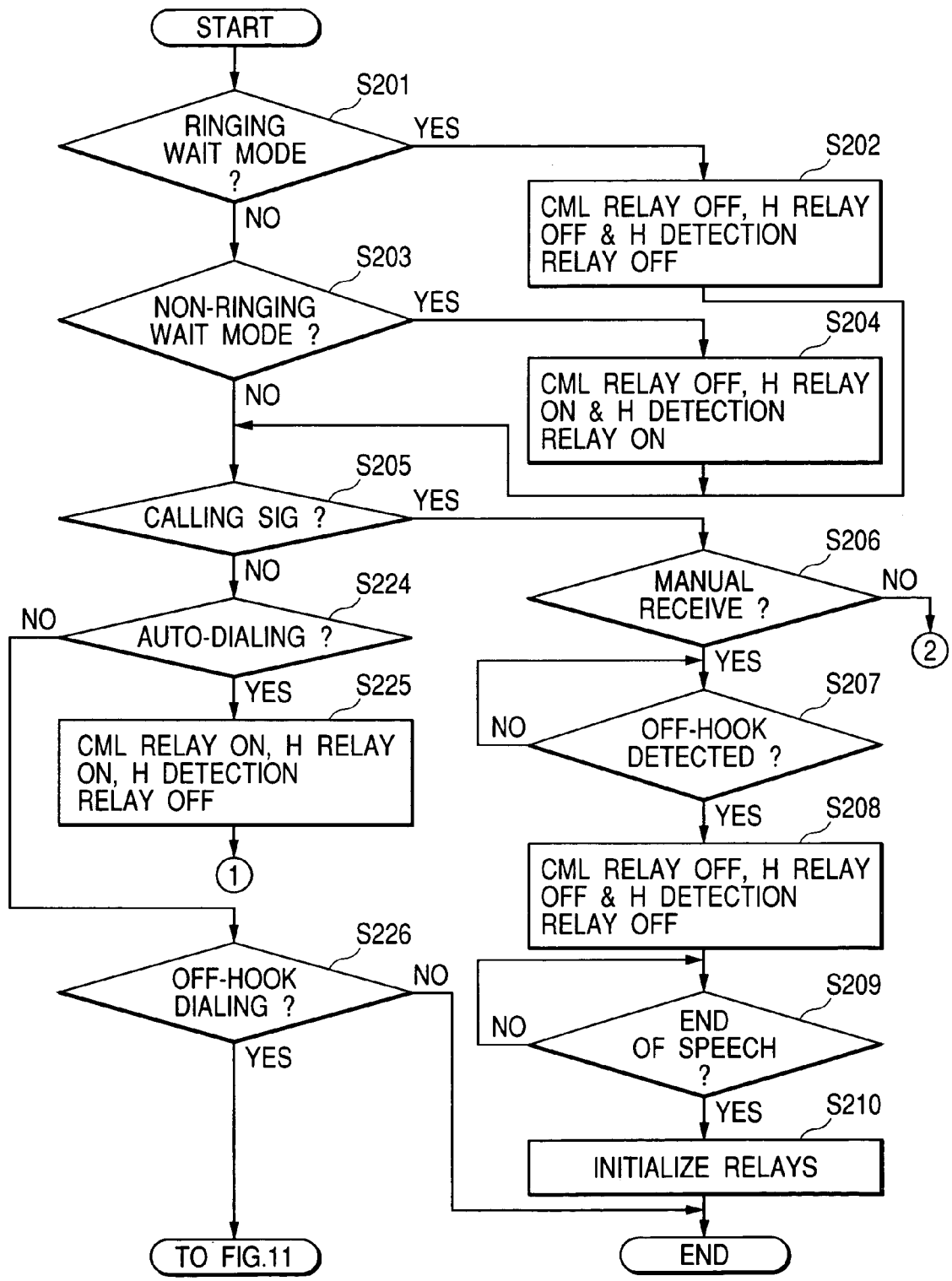
FIG. 9 is a flowchart showing control operations of a variety of relays.
Figure 10:
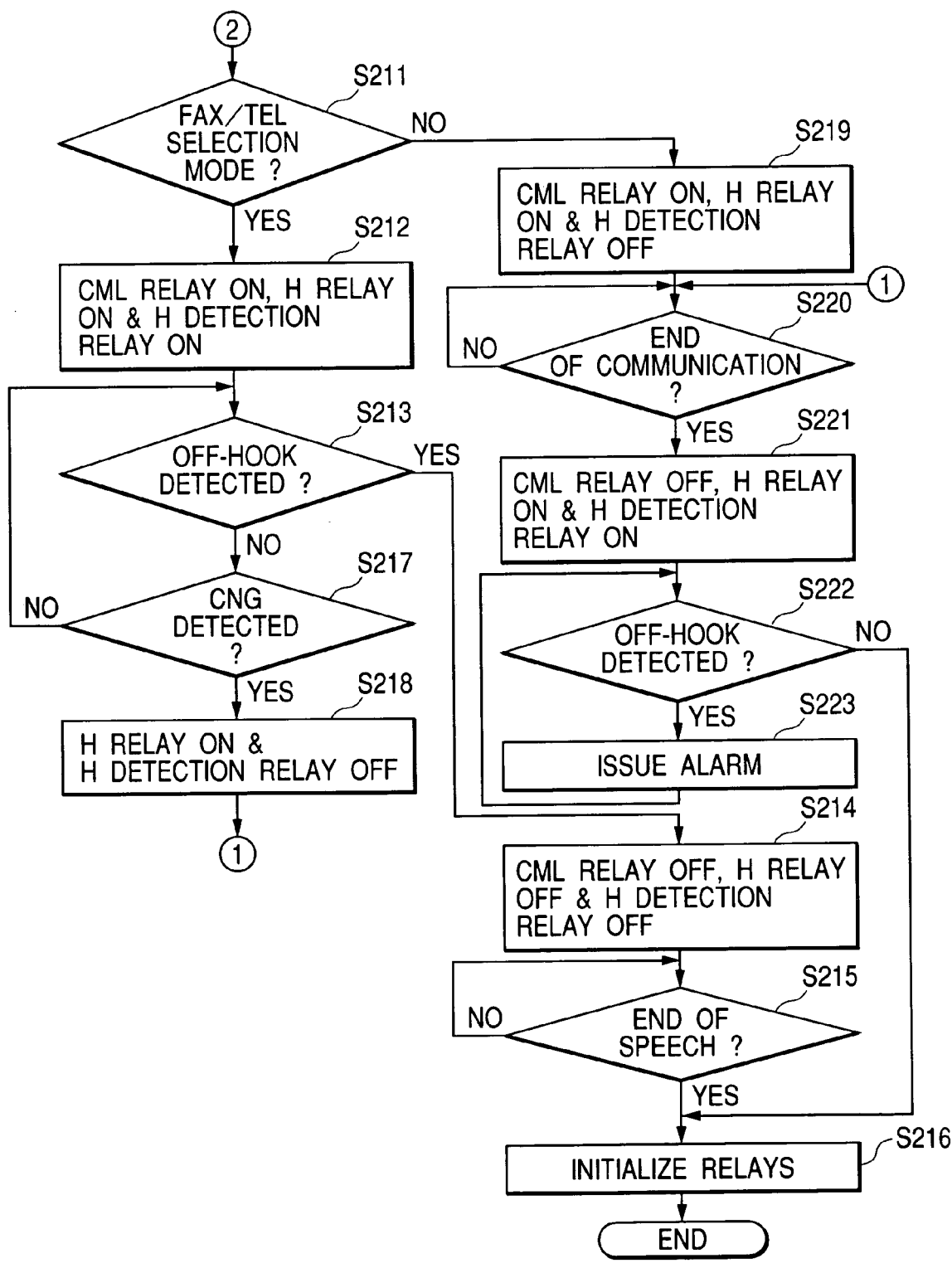
FIG. 10 is a flowchart showing the control operations of the variety of relays.

FIGS. 9 and 10 are flowcharts showing how the control operations of the variety of relays are conducted in the NCU 100.

The CPU 101 judges whether the ringing wait state is set or not (S201). If the ringing wait state is set, the CPU 101 switches OFF both of the CML relay 3 and the H relay 7 (the states of the CML relay 3 and the H relay 7 shown in FIG. 7) in the wait state (S202). Hence, the line connected to the terminal L1/L2 is connected directly to the telephone set connected to the terminal T1/T2 and, when the calling signal arrives from the line (S205), the telephone set 117 rings. If a manual receiving mode is set (S206) and the telephone set 117 is off-hooked (S207), both of the H relay and the H detection relay are switched OFF while the CML relay is kept OFF (S208), thereby setting the telephone set in a speech allowable state. The hook-state of the telephone set is monitored by the HOOK detector 6. Upon detecting an end of the speech (S209), each of the relays is initialized, thus terminating the operation (S210).

Next, the CPU 101 judges whether the non-ringing wait state is set or not (S203). If the non-ringing wait state is set, the CPU 101 switches OFF the CML relay 3 but switches ON the H relay 7 and the H detection relay 9 (the H relay 7 is in the state of being connected to the HOOK detector 8 and to the H detection relay 9, while the H detection relay 9 is in the state of being connected to the diode bridge 1) (S204). The telephone set is connected to the line via the diode bridge 1 and the H detection relay 9.

In this circuitry, the signal from the line is rectified through the diode bridge 1, and the direct current is outputted. Hence, when the calling signal reaches from the line, the telephone set 117 does not ring, but the hook-state of the telephone set 117 can be grasped through the HOOK detector 8. In a case where the CPU 101 detects that the user hooks off the telephone set, the connection between the line and the telephone set is established by switching OFF both of the CML relay 3 and the H relay 7 and also switching OFF the H detection relay.

Herein, the non-ringing wait state can be set in the F/T selection mode and the auto receiving mode but can not be set in the manual call receiving mode.

Next, if the manual call receiving mode is not set, it is judged whether the mode is a FAX/TEL mode (a call received is FAX or telephone) or not. In the case of the telephone, the user is prompted to hook off the telephone set, and, in the case of the FAX, it is judged whether or not the mode is a auto FAX receiving mode or not (S211).

The line is captured by switching ON the CML relay 3, and both of the H relay 7 and the H detection relay 9 are switched ON (S212). The telephone set is supplied with the electricity via the diode bridge 1. Hence, the CPU 101 is capable of the hook detection involving the use of the HOOK detector 8 (S213), however, it is not meant to say that the telephone set exerts no (zero) influence on the line. Herein, when the off-hook is detected, both of the CML relay 3 and the H relay 7 are switched OFF, the H detection relay 9 is likewise switched OFF, the operation moves to a speech. When the speech comes to an end (S215) the respective relays are initialized and the operation is terminated (S216). In the case of detecting a CNG signal without detecting the off-hook (S217), the H relay 7 is switched ON while the H detection relay 9 is switched OFF (S218), and the operation moves to the communications.

Herein, during the communications, the H detection relay 9 is switched OFF, and it is therefore possible to surely eliminate the influence of the telephone set.

If judged not to be the F/T selection mode, i.e., in the case of the auto call receiving mode (it is judged that the line is used for the communications, etc.), the line is captured by switching ON the CML relay 3, the H relay 7 is switched ON, and the H detection relay 9 is switched OFF (S219). Then, the variety of relay control units are controlled so that the supply of electricity via the diode bridge 1 is not conducted. Hence, the influence of the telephone set 117 upon the communications can be completely removed. Inversely, however, the hook condition of the telephone set can not be known.

As described above, however, it is of no importance that the hooking cannot be even detected during the communications. The reason why not important is that it is the communication ending point of time that requires the hook detection (S220) and, if the telephone set connected to the terminal T1/T2 is meaninglessly off-hooked (S222), an off-hook alarm is merely issured. Therefore, simply, the H detection relay driving unit 111 is controlled so that the H detection relay 9 is switched ON just when judging that the communications are finished (S221), then the hook-state is detected. When the telephone set is off-hooked (S222), processing in step S216 is executed.

Further, if it is judged that auto dialing for the FAX communications is done (S224), the line is captured by switching ON the CML relay 3, the telephone set is disconnected from the line by switching ON the relay 7, and the H detection relay 9 is switched OFF (S225). Then, the supply of electricity via the diode bridge 1 is not carried out. Thereafter, although the dial signal is transmitted, this does not need to detect the hooking either, and hence the CPU 101 does not perform the hook detection. Herein, the reason why the hook detection is not done is that it is improbable to discontinue the dialing operation midways by on-hooking the telephone set connected to the terminal T1/T2.

In the case of noticing an input mistake after inputting the telephone number by dialing from the FAX side (S226) in the state where the telephone set connected to the T1/T2 is off-hooked, the user again off-hooks the telephone set after temporarily returning the telephone set, and inputs a correct telephone number. According to the configuration described above, however, the hook-state of the telephone set connected to the terminal T1/T2 cannot be detected during dialing, and therefore the CPU 101 on the apparatus side does not notice that the telephone set has been off-hooked. Therefore, the mis-inputted telephone number is dialed from the FAX side, and subsequently the telephone number re-inputted by the user is dialed from the FAX side.

Then, the exchanger is bound to establish the connection to the telephone number dialed for the first time, and hence there arises a problem in which the telephone set is connected to the telephone number dialed for the first time in spite of redialing by the user.

Next, the off-hook dialing operation in the present embodiment will be described.

Figure 11:
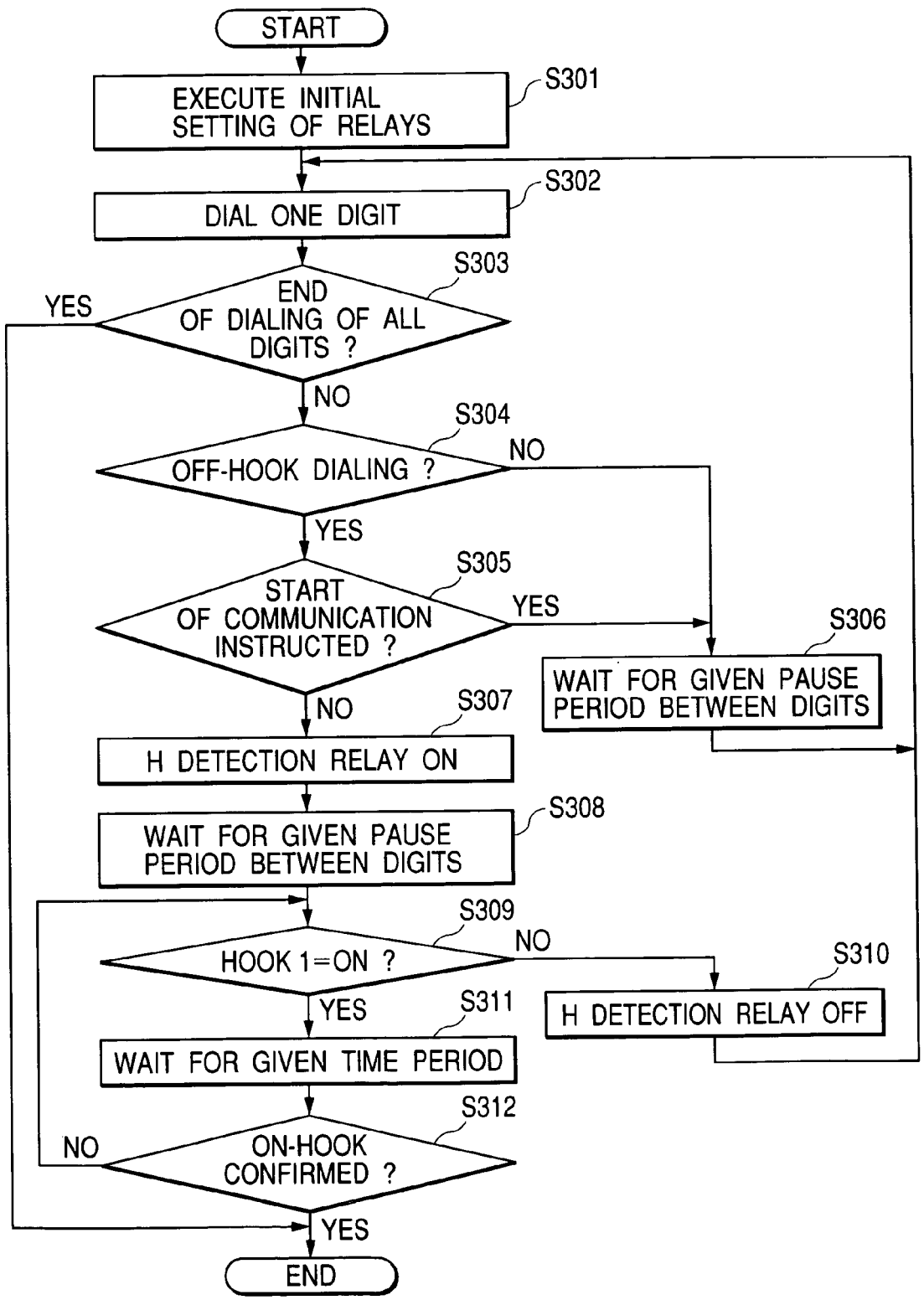
FIG. 11 is a flowchart showing an off-hook dialing operation in the embodiment described above.

FIG. 11 is a flowchart showing the off-hook dialing operation in the present embodiment. This operation is executed by the CPU 101 reading the program stored on the R 102. The CPU 101 controls the CML relay driving unit 109, the H relay driving unit 110 and the H detection relay driving unit 111 through the relay control unit 108, thereby executing the ON/OFF control of the CML relay, the H relay and the P relay.

The CPU 101 detects the hook-state of the telephone set 117 and judges that the off-hook dialing is started by an operation of the operation unit 116. In this case, in S301, the CPU 101 initializes the relays. Herein, the line is captured by switching ON the CML relay 3, and the P relay 2 is switched OFF, thus providing a signal transmissible state. Then, the H relay 7 is switched ON, the telephone set is disconnected from the line, the H detection relay 9 is switched OFF, and there is set a state where the connection via the diode bride 1 is not established.

In S302, the dialing for one digit is made. A dialing method is known and therefore a detailed explanation thereof is not given herein. In the case of DTMF (Dual Tone Multiplexed Frequency), a DTMF signal is transmitted from the MODEM 107. In the case of pulses, after switching ON the P relay 2, the CML relay 3 is switched OFF, and an influence of the transformer 4 is eliminated. Thereafter, the P relay 2 is switched OF/ON, thereby generating the pulses. After generating a desired number of pulses, the CML relay 3 is switched ON while switching OFF the P relay 2, and the dialing for one digit comes to an end.

Figure 12:
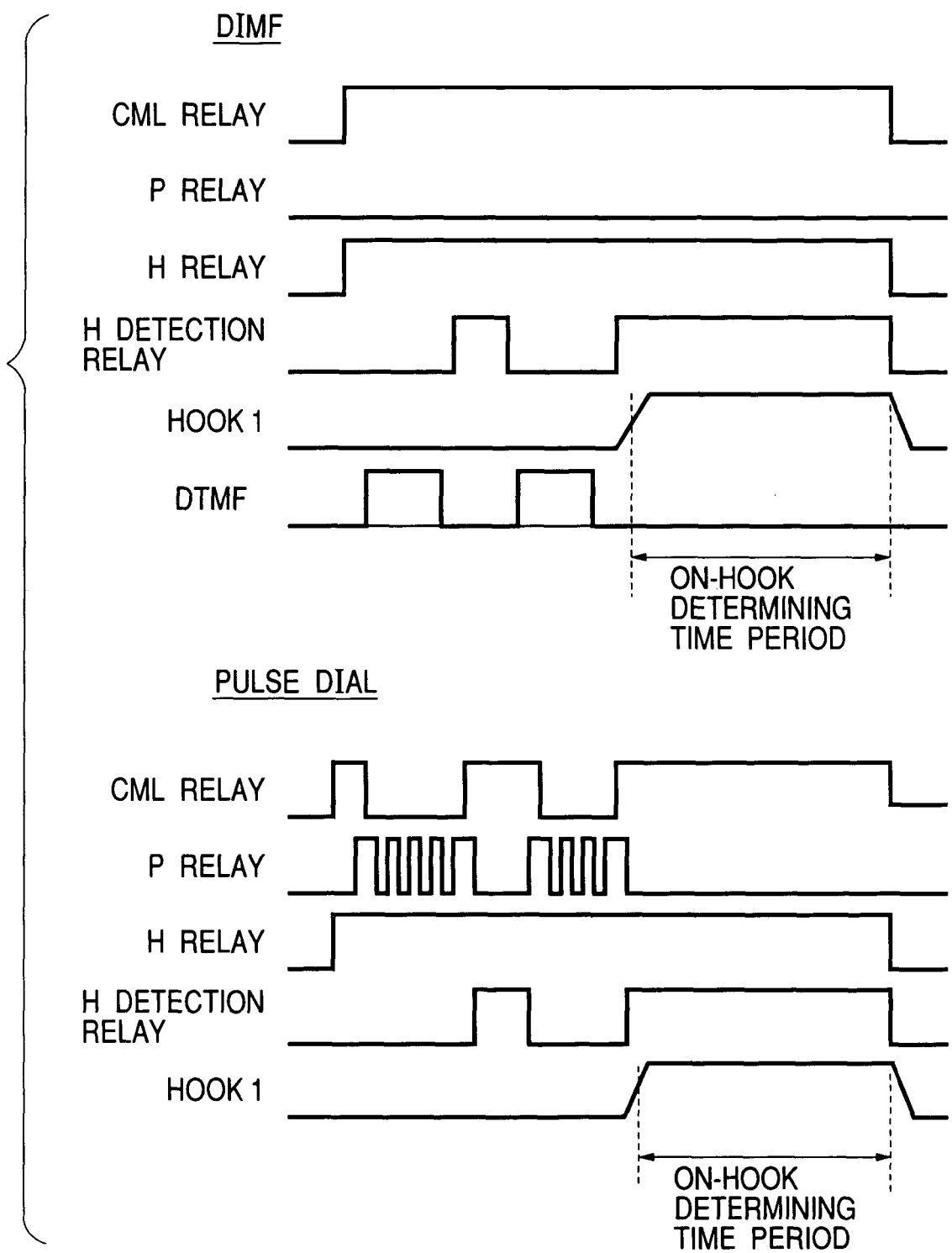
FIG. 12 is a timing chart showing an operation in the embodiment described above.

FIG. 12 is a timing chart showing the operations in the embodiment described above.

In S303, it is checked whether or not the dialing for all the digits has been finished. If the dialing for all the digits has been finished, the dial processing is terminated. If the dialing for remaining digits is not yet done, the processing proceeds to step S304.

In S304, it is checked whether the dialing is off-hook dialing or not. If other than the off-hook dialing, the hook detection is not required and is not therefore carried out. In S306, after waiting for only a given pause between digits (which might be expressed such as an inter-digit pause time), the processing makes a loopback to step S302, and the dialing continues. Herein, the reason why the hook detection is not needed if other than the off-hook dialing, is that a halfway discontinuation of the dialing is detected by detecting that an unillustrated stop key is pressed, a hook key is operated and so on.

When judging in S304 that the dialing is the off-hook dialing, it is checked in S305 whether a communication start instruction is received or not. According to the present embodiment, when the user presses a start key, it is judged that the communication start instruction has been received. In the case of having received the communication start instruction, hereafter a halt of the dialing operation is done by the unillustrated stop key of the operation unit 116, and therefore the hooking of the telephone set is not detected. Hence, there is the wait for only the inter-digit pause time in S306, and thereafter the processing makes the loopback to step S302, wherein the dialing continues.

When judging in S305 that the communication start instruction is not received, in S307, the H detection relay 9 is switched ON, and the hook detectable state is thus prepared. In S308, there is a wait for only a given inter-digit pause time, and thereafter, the HOOK1 signal is checked in S309. Herein, if in the off-hook-state, the H detection relay 9 is switched OFF in S310, and the processing returns to S302, wherein the dialing continues.

When judging in S309 that the state is the on-hook-state, there is a wait for an arbitrarily given period of time in S311. According to the present embodiment, it is assumed that this arbitrarily given period of time be 500 ms. It is checked in S312 whether the on-hook is confirmed or not. In the present embodiment, the hook determination is made in a task different from the dialing, and the control in an execution task for dialing is performed by referring to a result of the determination. A hook determining method will hereinafter be explained.

When judging in S312 that the on-hook is confirmed, the dial processing comes to an end. Whereas if the on-hook is judged to be unrecognized, the processing goes back to S309, wherein the HOOK1 signal is rechecked. Hereafter, a loop of processing in S309 to S312 is repeated till the on-hook is confirmed or the HOOK1 signal reverts to the off-hook-state.

What has been discussed so far is the operation of the dial processing in the present embodiment.

Next, hook determination processing in the present embodiment will be described.

Figure 13:
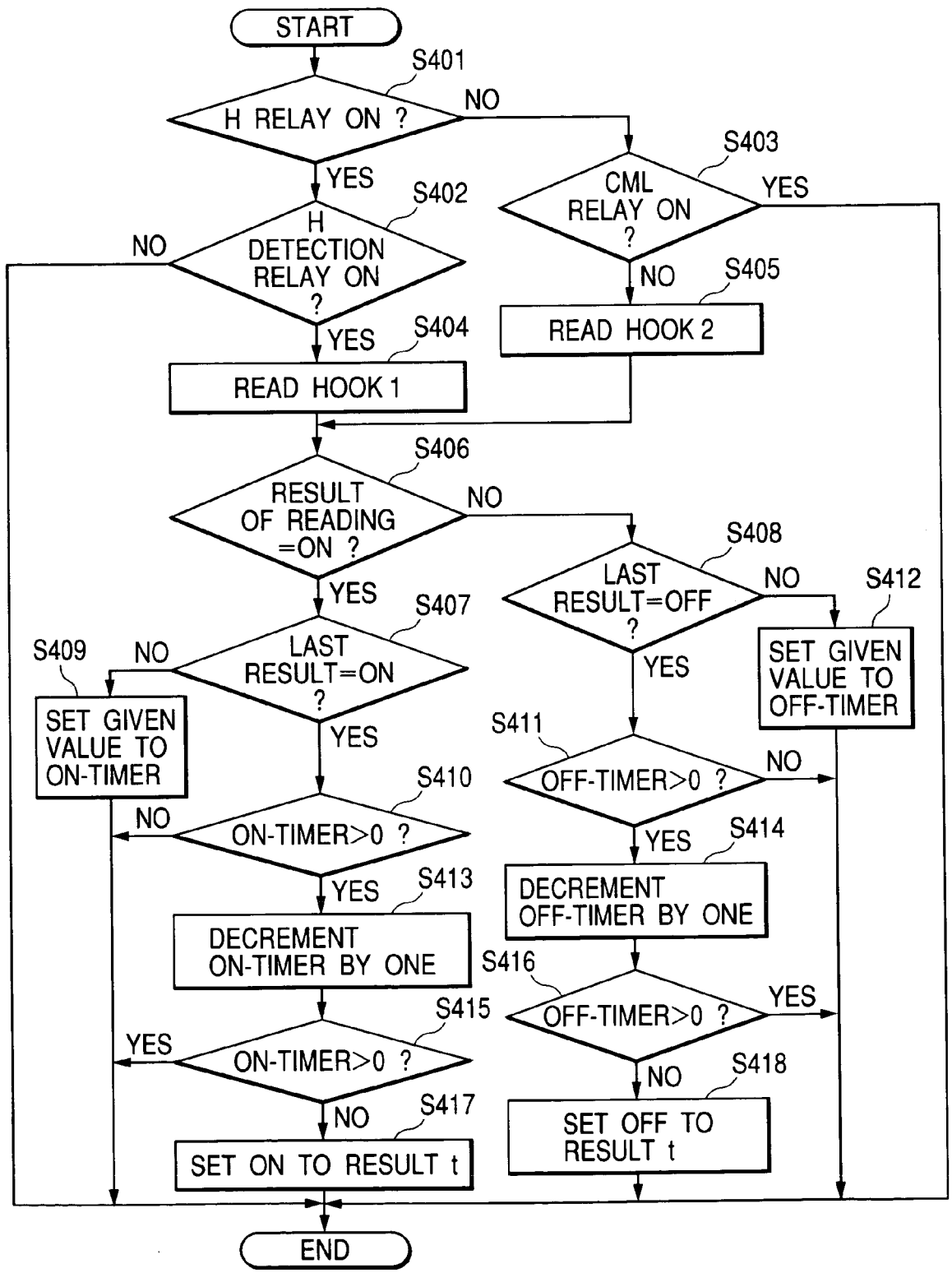
FIG. 13 is a flowchart showing a hook determination processing operation in the embodiment described above.

FIG. 13 is a flowchart showing an operation of the hook determination processing in the present embodiment. This operation is executed by the CPU 101 reading the program stored on the ROM 12.

The hook determination processing is executed in a period task having a period of 1 ms, and variables are initialized before starting the processing.

The variables used in the present embodiment include a variable Result stored with the result of the hooking, an ON-timer for recognizing the on-hook and an OFF-timer for recognizing the off-hook. The variable Result is initialized at ON. The ON-timer is initialized at 2200. The OFF-time is initialized at 200. Namely, this process is executed with the period of 1 ms. Therefore, the on-hook is recognized in 2.2 s, and the off-hook is recognized in 0.2 s.

To start with, it is checked in S401 whether the H relay 7 is switched ON or not. If switched ON, it is checked in S402 whether the H detection relay 9 is switched ON or not. If the H detection relay 9 is judged ON, the telephone set is supplied with the electricity from the line via the diode bridge 1→ the H detection relay 9→ the H relay 7 in this sequence, whereby the HOOK detector 8 becomes capable of detecting the hooking. Hence, the HOOK1 signal is read in S404, and the processing advances to step S406.

When detecting in S402 that the H detection relay 9 is switched OFF, the hook detection is unable to be done, and therefore the hook determination processing is finished. At this time, the variables such as Hook Result, etc. are not updated, and hence the result acquired when being possible of the hook detection is taken over.

When judging in S401 that the H relay 7 is switched OFF, it is checked in S403 whether the CML relay 3 is switched OFF or not. If the CML relay 3 is judged OFF, the telephone set is supplied with electricity from the line via the CML relay 3→ the H relay 7 in this sequence, whereby enabling the HOOK detector 6 to detect the hooking.

Hence, the HOOK2 signal is read in S405, and the processing proceeds to step S406. When detecting in S403 that the CML relay 3 is switched ON, the hook detection is unable to be done, and therefore the hook determination processing is finished. At this time, the variables such as the hook result, etc. are not updated, and hence the result acquired when being possible of the hook detection is taken over.

It is judged in S406 whether the hook result read in step S404 or S405 is ON or OFF. If the hook result is ON, it is checked in S407 whether the read result of the last time is ON or not. If judged ON last time also, a value of the ON-timer is checked in S410. If the value of the ON-timer is larger than 0, the value is decremented by 1 in S413. It is checked in S415 whether a decrement result is 0 or not. If the decrement result is 0, ON is written to the variable Result in S417.

In S410, if the value of the ON-timer is 0, ON has already been written to the variable Result, and hence the processing from this step onwards is not executed but terminated. In S415, if the value of the ON-timer is larger than 0, this implies that the recognition is underway, so that the processing comes to an end without updating the variable Result.

Further, in S407, if judged not to be ON last time, this indicates a change to ON from OFF this time. Therefore, for starting an ON's examination, in S409, the initial value of 2200 is written to the ON-timer, thus finishing the processing.

In the way described above, the on-hook is recognized only when ON continues during a period of 2200 ms since the result of the HOOK1 signal or HOOK2 signal changed to ON from OFF, and the variable result is updated to ON. The variable Result is not updated in cases other than the above-mentioned.

The recognition of the off-hook is made in the same way as it has been done above, wherein if judged OFF in S406, it is checked in S408 whether the read result of the last time is OFF or not. Then, if judged OFF last time also, the OFF-timer is checked in S411, and, if the value of the OFF-timer is larger than 0, the value is decremented by 1 in S414.

Subsequently, if the decrement result is 0 in S416, OFF is written to the variable Result in S418. When judging in S411 that the value of the OFF-timer is 0, OFF has already been written to the variable Result, and therefore the processing from this step onwards is not executed but finished.

When judging in S416 that the value of the OFF-timer is larger than 0, the recognition is underway, so that the variable Result is not updated, and the processing comes to an end.

Further, in S408, if judged not to be OFF last time, this indicates a change to OFF from ON this time. Therefore, for starting an OFF's examination, in S412, the initial value of 200 is written to the OFF-timer, thus finishing the processing.

The operation described above is the hook determination processing.

In S312 of the dial processing flow shown in FIG. 11, the variable Result is read, and it is judged whether an end of the dialing is possible or impossible.

According to the present embodiment, in the off-hook dialing, the influence of the telephone set is eliminated by switching OFF the H detection relay in the process of dialing. At the same time, the H detection relay is switched ON in the inter-digit time of dialing, whereby the hook-state of the telephone set can be detected.

Further, as the inter-digit time of dialing is quite short, it is difficult to surely judge the on-hook. For instance, according to NTT's technical data, a discriminating time of a disconnection signal is equal to or larger than 0.3 s at a hooking non-allowable time and equal to or larger than 2.2 s at a hooking allowable time. In the case of DTMF, however, the inter-digit pause time is merely on the order of several tens milliseconds (ms) through one hundred several tens milliseconds (ms) and, even in the pulse dialing, on the order of several hundreds milliseconds (ms).

Such being the case, according to the present embodiment, in the case of detecting the on-hook-state for the inter-digit time of dialing, a sufficient hook detection time is gained by delaying the dialing of the next digit, thereby scheming to improve an accuracy of the hook detection.

Moreover, if the user indicates the FAX transmission by pressing the start key, etc. after inputting the dial in the off-hook-state, normally the user immediately returns the telephone set, and consequently the dialing is finished halfway, resulting in such a possibility that the FAX transmission is not executed. This being the case, according to the present embodiment, when receiving the transmission start instruction from the user, the hook detection is not performed for the inter-digit time, thereby further enhancing the utility.

The present invention exhibits a remarkable effect, wherein the apparatus can be provided at the low costs by utilizing the current flowing from the line to execute the hook detection.

The present invention exhibits an effect, wherein the influence of the telephone set upon the communications can be completely eliminated during the communications and the dialing as well.

The present invention exhibits an effect, wherein in the facsimile apparatus having no DC power source for the exclusive use for the hook detection, the hook-state in the off-hook dialing can be surely detected, and there can be removed the possibility of mis-dialing in such a case that when after dialing from the FAX side in the off-hook-state of the telephone set, the mistake in inputting the telephone number is noticed, the correct telephone number is inputted and after on-hooking the telephone set, the telephone set is off-hooked.

The present invention exhibits an effect, wherein the influence of the telephone set upon the communications can be completely eliminated during the dialing.

The present invention exhibits an effect, wherein in the case of judging whether the call received is directed to the telephone or the facsimile, when the telephone set is off-hooked, the hooking can be surely detected even the hook detection is conducted based on the line current.

The present invention exhibits an effect, wherein when the non-ringing receipt mode is set, the call can be received without causing the telephone set to ring by rectifying the call receiving signal, and, in the case of off-hooking the telephone set, the hooking can be surely detected even if the hook detection is executed based on the line current.

The present invention exhibits an effect, wherein the hook-state in the off-hook dialing can be surely detected even in the case of executing the hook detection based on the line current, and it is possible to certainly eliminating the possibility of mis-dialing in the case of noticing the mistake in inputting the telephone number after dialing from the side of the communication apparatus in the off-hook-state of the telephone set.

The present invention exhibits an effect, wherein the hook detecting means can be for sure supplied the electricity without receiving the ON/OFF influence of the first switch means by disposing the second switch means closer to the line than the first switch means.

The present invention exhibits an effect of being capable of corresponding to the ringing call receiving mode even when the second hook detecting means cooperating with the third switch means detects the hooking from the line current.

The present invention exhibits an effect of being capable of completely eliminating the influence of the telephone set upon the communications during the communications.

The present invention exhibits an effect, wherein the capture of the line after finishing the communications can be detected even in the case of the performing the hook detection based on the line current, and it is therefore possible to prevent a futile line connection from being established when the handset of the telephone set comes off by mistake.

The present invention exhibits such a remarkable effect that the apparatus can be provided at the low costs by utilizing the current flowing from the line and executing the hook detection. Another effect is that the influence of the telephone set upon the communications can be completely removed during the communications and the dialing. A further effect is that in the case of judging whether the call received is directed to the telephone set or the facsimile, if the telephone set is off-hooked, the hooking can be surely detected even when the hook detection is done based on the line current. In the case here the non-ringing call receiving mode is set, the call can be received without causing the telephone set to ring.

What is claimed is:

1. A communication apparatus comprising:
   first communication means for connecting to a telephone line and thus performing communications;
   connecting means for connecting second communication means which connects to the telephone line via said first communication means and thus performing communications;
   first switch means for connecting the telephone line to said first communication means or said second communication means;
   first route means for connecting said second communication means to the telephone line via said first switch means;
   second route means for connecting said second communication means directly to the telephone line;
   second switch means for connecting said second communication means to said first route means or said second route means;
   first hook detecting means connected to said first route means; and
   second hook detecting means connected between the telephone line of said second route means and said second switch means.

2. A communication apparatus according to claim 1, wherein when said second switch means connects said second communication means to said first route means, said first hook detecting means detects a hook state of said second communication means, and when said second switch means connects said second communication means to said second route means, said second hook detecting means detects a hook state of said second communication means.

3. A communication apparatus according to claim 1, wherein said first hook detecting means is connected between said first switch means on said first route means and said second switch means.

4. A communication apparatus according to claim 1, wherein said first hook detecting means is connected between the telephone line and said first switch means.

5. A communication apparatus according to claim 1, wherein an off-hook detection current value of said second hook detecting means is smaller than an off-hook detection current value of said first hook detecting means.

6. A communication apparatus according to claim 1, wherein said first communication means includes timer determining means for judging, when an output of said hook detecting means changes, that a hook state changes after a fixed period time since the output has changed.

7. A communication apparatus according to claim 1, wherein current rectifying means constructed of four pieces of unidirectional devices, is provided between the telephone line of said second route means and said second switch means.

8. A communication apparatus according to claim 1, further comprising means for connecting said second switch means to said first route means when said first switch means is connected to the side of said first communication means.

9. A communication apparatus according to claim 1, wherein said second route means includes a third switch means between the telephone line and said second switch means, and said third switch means is means for connecting and disconnecting said second route means.

10. A communication apparatus according to claim 9, wherein said third switch means is set in a second route means connecting state in the case of detecting the hook state of said second communication means when said second switch means is connected to said second route means.

11. A communication apparatus according to claim 10, wherein said first switch means is connected to said first communication means, and said third switch means is set in a second route means disconnecting state during an operation of said first communication means.

12. A communication apparatus according to any one of claims 1 through 11, wherein a MODEM is used for said first communication means, and said second communication means is a telephone set.

13. A communication apparatus capable of dialing from said communication apparatus in a state where a telephone set is connected and a handset is off-hooked, said communication apparatus comprising:
   line disconnecting means for disconnecting the handset from a line during dialing; and
   hook state detecting means for detecting a hook state of the handset from a line current by connecting the handset to the line in an inter-digit time of dialing.

14. A communication apparatus according to claim 13, wherein said hook state detecting means includes stopping means for stopping transmitting a next digit in the case of judging in the inter-digit time that the handset is in an on-hook state.

15. A communication apparatus according to claim 13, wherein said hook state detecting means includes:
   digit transmission delaying means for delaying the transmission of the next digit in the case of detecting in the inter-digit time that the handset is in the on-hook state;
   dial interrupting means for interrupting dialing when the on-hook state consecutively continues for only an arbitrarily given on-hook determining time; and
   dial processing continuing means for continuing the dial processing in the case of returning to the off-hook state before the on-hook determining time elapses.

16. A communication apparatus according to claim 13, wherein said hook state detecting means is means that does not monitor the hooking in the inter-digit time from when receiving a communication start instruction onwards in the case of having receiving the communication start instruction from a user.

17. A communication apparatus comprising:
  connecting means for connecting a telephone set through said communication apparatus;
  first switch means for connecting a telephone line by switching over a communication unit of said communication apparatus and said telephone set;
  hook detecting means, connected to the telephone line without through said first switch means, for detecting a hook state of said telephone set from a current supplied from the telephone line; and
  second switch means enabling, if said telephone set is off-hooked, the current from the telephone line to flow to said telephone set and said hook detecting means,
  wherein when dialing is done from said communication unit of said communication apparatus, said first switch means connects said communication unit of said communication apparatus to the telephone line, and said second switch means disconnects said telephone set from the telephone line.

18. A communication apparatus according to claim 17, wherein said second switch means disconnects said telephone set from the telephone line during dialing, and in an inter-digit time during the dialing, said second switch means connects said telephone set to the telephone line, and said hook detecting means detects a hook state.

19. A communication apparatus according to claim 18, wherein when said hook detecting means detects an on-hook of said telephone set, the dialing is stopped.

20. A communication apparatus according to claim 17, wherein said second switch means is connected closer to the telephone line than said first switch means.

21. A communication apparatus according to claim 17, further comprising:
  second hook detecting means, connected to the telephone line through said first switch means, for detecting the hook state of said telephone set from a current supplied from the telephone line; and
  third switch means enabling the current from the telephone line to flow to said telephone set and said second hook detecting means when said telephone set is off-hooked,
  wherein in a ringing wait state in which said telephone set is made to ring in response to a call receiving signal, said first switch means disconnects said communication unit of said communication apparatus from the telephone line, said second switch means disconnects said telephone set from the telephone line, said third switch means connects said telephone set to the telephone line, and said telephone set is made to ring in response to a calling signal from the telephone line.

22. A communication apparatus according to claim 17, wherein in a state of using the line for communications, said first switch means connects said communication apparatus to the telephone line, and said second switch means disconnects said telephone set from the telephone line.

23. A communication apparatus according to claim 22, wherein when the communications are finished, said second switch means connects said telephone set to the telephone line, and said hook detecting means detects the hook state of said telephone set.

24. A communication apparatus comprising:
  connecting means for connecting a telephone set through said communication apparatus;
  first switch means for connecting a telephone line by switching over a communication unit of said communication apparatus and said telephone set;
  hook detecting means, connected to the telephone line without through said first switch means, for detecting a hook state of said telephone set from a current supplied from the telephone line; and
  second switch means enabling, if said telephone set is off-hooked, the current from the telephone line to flow to said telephone set and said hook detecting means,
  wherein when said communication unit of said communication apparatus judges whether a call received is given from FAX or a telephone, said first switch means connects said communication unit of said communication apparatus to the telephone line, and said second switch means connects said telephone set to the telephone line.

25. A communication apparatus comprising:
  connecting means for connecting a telephone set through said communication apparatus;
  first switch means for connecting a telephone line by switching over a communication unit of said communication apparatus and said telephone set;
  rectifying means for rectifying a line current supplied from the telephone line;
  hook detecting means, connected to the telephone line without through said first switch means, for detecting a hook state of said telephone set from a current supplied from the telephone line; and
  second switch means enabling, if said telephone set is off-hooked, the current from the telephone line to flow to said telephone set and said hook detecting means,
  wherein said rectifying means, said hook detecting means and said connecting means are connected in series,
  in a wait state, said first switch means disconnects said communication unit of said communication apparatus from the telephone line, and said second switch means connects said telephone set to the telephone line through said rectifying means, and
  said telephone set is thereby made not to ring in response to a calling signal from the telephone line.

26. A communication apparatus comprising:
  connecting means for connecting a telephone set through said communication apparatus;
  first switch means for connecting a telephone line, by switching over a communication unit of said communication apparatus and said telephone set;
  hook detecting means, connected to the telephone line without through said first switch means, for detecting a hook state of said telephone set from a current supplied from the telephone line;
  second switch means enabling, if said telephone set is off-hooked, the current from the telephone line to flow to said telephone set and said hook detecting means;
  determining means for determining a state of said communication apparatus; and
  control means for controlling said first switch means and said second switch means in accordance with a result of the determination made by said determining means.

27. A communication apparatus according to claim 26, further comprising:
  second hook detecting means, connected to the telephone line through said first switch means, for detecting the hook state of said telephone set from a current supplied from the telephone line; and
  third switch means enabling the current from the telephone line to flow to said telephone set and said second hook detecting means when said telephone set is off-hooked,
  wherein said control means is means for controlling said first switch means, said second switch means and said third switch means in accordance with the result of the determination made by said determining means.

* * * * *

UNITED STATES PATENT AND TRADEMARK OFFICE
CERTIFICATE OF CORRECTION

| | | |
|---|---|---|
| PATENT NO. | : 7,092,499 B2 | |
| APPLICATION NO. | : 10/628405 | |
| DATED | : August 15, 2006 | |
| INVENTOR(S) | : Hitoshi Saito et al. | |

It is certified that error appears in the above-identified patent and that said Letters Patent is hereby corrected as shown below:

COLUMN 7:

Line 36, "change." should read --changes.--.

COLUMN 8:

Line 32, "to" (first occurrence) should be deleted; and
    Line 65, "changes" should read --changing--.

COLUMN 9:

Line 28, "if" should be deleted.

COLUMN 10:

Line 51, "reaches directly" should read --directly reaches--.

COLUMN 14:

Line 27, "operation of the" (second occurrence) should be deleted; and
    Line 52, "operation of the" (second occurrence) should be deleted.

COLUMN 16:

Line 6, "alter" should read --later--.

COLUMN 18:

Line 31, "why" should read --why it is--; and
    Line 35, "issured" should read --issued--.

COLUMN 19:

Line 22, "bride" should read --bridge--; and
    Line 31, "OF/ON," should read --OFF/ON,--.

COLUMN 22:

Line 56, "eliminating" should read --eliminate--.

UNITED STATES PATENT AND TRADEMARK OFFICE
CERTIFICATE OF CORRECTION

PATENT NO. : 7,092,499 B2
APPLICATION NO. : 10/628405
DATED : August 15, 2006
INVENTOR(S) : Hitoshi Saito et al.

It is certified that error appears in the above-identified patent and that said Letters Patent is hereby corrected as shown below:

COLUMN 23:

Line 23, "here" should read --where--.

COLUMN 24:

Claim 6, Line 7, "time" should read --of time--;
    Claim 13, Line 40, "disconnecting" (both occurrences) should read --connecting/disconnecting--;
    Claim 13, Line 41, "from a line during dialing; and" should read --to/from a line;--;
    Claim 13, Line 43, "current by connecting the" should read --current; and--;
    Claim 13, Line 44, "handset to the line in an inter-digit time of dialing." should read --control means for causing said line connecting/disconnecting means to disconnect the handset from the line in the process of transmitting a dial digit signal, and for, during the time period between digits of the dial signal, causing said line connecting/disconnecting means to connect the handset to the line and then causing said hook state detecting means to detect a hook state of the handset.--;
    Claim 14, Line 48, "the" (first occurrence) should read --an-- and "time" should read --time of dialing--;
    Line 53, "the" (third occurrence) should read --an--;
    Line 54, "time" should read --time of dailing--;
    Line 63, "means" (second occurrence) should read --a means--;
    Line 64, "the" (second occurrence) should read --an-- and "time" should read --time of dialing--; and
    Line 66, "receiving" should read --received--.

UNITED STATES PATENT AND TRADEMARK OFFICE
CERTIFICATE OF CORRECTION

PATENT NO. : 7,092,499 B2  
APPLICATION NO. : 10/628405  
DATED : August 15, 2006  
INVENTOR(S) : Hitoshi Saito et al.

It is certified that error appears in the above-identified patent and that said Letters Patent is hereby corrected as shown below:

COLUMN 26:

Line 62, "means" (second occurrence) should read --a means--.

Signed and Sealed this

Twenty-second Day of May, 2007

JON W. DUDAS  
*Director of the United States Patent and Trademark Office*